United States Patent
Wang et al.

(10) Patent No.: US 12,206,114 B2
(45) Date of Patent: Jan. 21, 2025

(54) ELECTROCHEMICAL DEVICE AND ELECTRONIC DEVICE INCLUDING SAME

(71) Applicant: NINGDE AMPEREX TECHNOLOGY LIMITED, Ningde (CN)

(72) Inventors: Kefei Wang, Ningde (CN); Zhen Dai, Ningde (CN); Yingying Wang, Ningde (CN); Feng Zhou, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 949 days.

(21) Appl. No.: 16/970,789

(22) PCT Filed: Dec. 25, 2019

(86) PCT No.: PCT/CN2019/128449
§ 371 (c)(1),
(2) Date: Aug. 18, 2020

(87) PCT Pub. No.: WO2021/128095
PCT Pub. Date: Jul. 1, 2021

(65) Prior Publication Data
US 2023/0155132 A1    May 18, 2023

(51) Int. Cl.
| | | |
|---|---|---|
| *H01M 4/62* | (2006.01) | |
| *H01M 4/02* | (2006.01) | |
| *H01M 4/587* | (2010.01) | |
| *H01M 10/0525* | (2010.01) | |
| *H01M 10/0569* | (2010.01) | |

(52) U.S. Cl.
CPC .......... *H01M 4/628* (2013.01); *H01M 4/587* (2013.01); *H01M 10/0525* (2013.01); *H01M 10/0569* (2013.01); *H01M 2004/021* (2013.01); *H01M 2004/027* (2013.01); *H01M 2300/004* (2013.01)

(58) Field of Classification Search
CPC .. H01M 4/628; H01M 4/587; H01M 10/0525; H01M 10/0569
See application file for complete search history.

(56) References Cited

U.S. PATENT DOCUMENTS

| | | | | |
|---|---|---|---|---|
| 11,024,884 | B2* | 6/2021 | Wang | H01M 10/0525 |
| 2005/0198815 | A1* | 9/2005 | Suzuki | H01M 4/13 |
| | | | | 29/623.5 |
| 2010/0099031 | A1* | 4/2010 | Kato | H01M 10/0567 |
| | | | | 429/345 |
| 2012/0035600 | A1 | 2/2012 | Gaudiosi et al. | |
| 2014/0178732 | A1* | 6/2014 | Mizawa | H01M 10/0587 |
| | | | | 429/94 |
| 2019/0296400 | A1 | 9/2019 | Sekiguchi et al. | |
| 2020/0303767 | A1* | 9/2020 | Wang | H01M 10/0567 |

FOREIGN PATENT DOCUMENTS

| | | | | |
|---|---|---|---|---|
| CN | 1405919 | A | 3/2003 | |
| CN | 1545742 | A | 11/2004 | |
| CN | 101663790 | A | 3/2010 | |
| CN | 102064326 | A | 5/2011 | |
| CN | 103582973 | A | 2/2014 | |
| CN | 104025350 | A * | 9/2014 | ............ H01M 4/13 |
| CN | 105074994 | A | 11/2015 | |
| CN | 105489937 | A | 4/2016 | |
| CN | 105990599 | A | 10/2016 | |
| CN | 108134043 | A | 6/2018 | |
| CN | 109301322 | A | 2/2019 | |
| CN | 109980225 | A | 7/2019 | |
| CN | 110376103 | A | 10/2019 | |
| EP | 3490050 | A1 | 5/2019 | |
| JP | H1092436 | A | 4/1998 | |
| JP | 2002260636 | A | 9/2002 | |
| JP | 2006107896 | A | 4/2006 | |
| JP | 2008269978 | A | 11/2008 | |
| JP | 2012038597 | A | 2/2012 | |
| JP | 2016173886 | A | 9/2016 | |
| JP | 2019175657 | A | 10/2019 | |
| WO | 2014171053 | A1 | 10/2014 | |

OTHER PUBLICATIONS

Chinese First Office Action mailed Jan. 10, 2023 in counterpart Chinese application CN201911360667.1, 12 pages in Chinese.
PCT International Search Report mailed Nov. 9, 2022 in counterpart PCT application PCT/CN2019/128449, 4 pages in Chinese.
Partial European Search Report mailed Nov. 18, 2022 in counterpart European application EP19957499.7, 15 pages in English.
Japanese Office Action mailed Apr. 4, 2023 in counterpart Japanese application JP2022516386, 7 pages in Japanese.
Reconsideration Report by Examiner before Appeal mailed (drafted) on Feb. 20, 2024, in Japanese Application No. 2022-516386, 5 pages. (with translation).

* cited by examiner

*Primary Examiner* — Karie O'Neill Apicella
(74) *Attorney, Agent, or Firm* — XSENSUS LLP

(57) ABSTRACT

An electrochemical device including a cathode, an anode and an electrolyte. The anode includes an anode active material layer, and the contact angle of the anode active material layer relative to a non-aqueous solvent is not greater than 60° as measured by a contact angle measurement. The electrochemical device has improved cycle performance.

17 Claims, No Drawings

ELECTROCHEMICAL DEVICE AND ELECTRONIC DEVICE INCLUDING SAME

CROSS REFERENCE TO RELATED APPLICATIONS

The present application is a National Stage application of PCT international application PCT/CN2019/128449, filed on Dec. 25, 2019, the entire content of which is incorporated herein with reference.

BACKGROUND

1. Technical Field

The present application relates to the technical field of energy storage, more particularly to an electrochemical device and an electronic device including the same, and more specifically to a lithium-ion battery.

2. Description of the Related Art

With the development of technology and the increasing demand for mobile devices, the demand for electrochemical devices (for example, lithium-ion batteries) has increased significantly. A lithium-ion battery which simultaneously has high energy density and excellent service life and cycle performance is an important research pursuit.

The theoretical capacity of a lithium-ion battery may vary with the type of the anode active material. As the cycle progresses, lithium-ion batteries generally have a decrease in charge/discharge capacity, causing a deterioration in the performance of the lithium-ion batteries. In recent years, in the manufacturing of the lithium-ion batteries, in order to reduce environmental impact and the like, aqueous slurry compositions using an aqueous medium as a dispersion medium have received more and more attention. However, due to the presence of bubbles in the slurry composition, the aqueous slurry may produce defects such as multiple pinholes and pits in the active material layer, thereby affecting the cycle performance of the electrochemical device.

In view of this, it is indeed necessary to provide an improved electrochemical device having excellent cycle performance and an electronic device including the same.

SUMMARY

Embodiments of the present application provide an electrochemical device and an electronic device including the same to solve at least one problem in the related art to at least some extent.

In one aspect of the present application, the present application provides an electrochemical device, including a cathode, an anode and an electrolyte, wherein the anode includes an anode active material layer, wherein the contact angle of the anode active material layer relative to a non-aqueous solvent is not greater than 60° as measured by a contact angle measurement.

According to some embodiments of the present application, the droplet diameter of the non-aqueous solvent on the anode active material layer is not greater than 30 mm as measured by a contact angle measurement.

According to some embodiments of the present application, the contact angle measurement means that after a 3-microliter droplet of diethyl carbonate is dropwise added to the surface of the anode active material layer, the contact angle of the droplet on the surface of the anode active material layer is tested within 100 seconds.

According to some embodiments of the present application, the porosity of the anode active material layer is 10% to 60%.

According to some embodiments of the present application, the anode active material layer includes a carbon material, the carbon material having at least one of the following features:
  (a) a specific surface area of less than 5 $m^2/g$;
  (b) a median particle size of 5 μm to 30 μm.

According to some embodiments of the present application, the anode active material layer includes at least one of artificial graphite, natural graphite, mesophase carbon microspheres, soft carbon, hard carbon, amorphous carbon, a silicon-containing material, a tin-containing material and an alloy material.

According to some embodiments of the present application, the anode active material layer further includes at least one metal of molybdenum, iron and copper, and based on the total weight of the anode active material layer, the content of the at least one metal is not greater than 0.05 wt %.

According to some embodiments of the present application, the anode active material layer further includes an auxiliary agent, the auxiliary agent having at least one of the following features:
  (a) an oxidation potential of not less than 4.5 V, and a reduction potential of not greater than 0.5;
  (b) a surface tension of not greater than 30 mN/m;
  (c) a nonionic surfactant is included;
  (d) based on the total weight of the anode active material layer, the content of the auxiliary agent is not greater than 3000 ppm.

According to some embodiments of the present application, the auxiliary agent includes a nonionic surfactant, and the nonionic surfactant includes at least one of polyoxyethylene ether, polyol ester, amide or block polyether.

According to some embodiments of the present application, the nonionic surfactant includes at least one of the following: polyoxyethylene alkanolamide, octyl phenol polyoxyethylene ether, nonyl phenol polyoxyethylene ether, high carbon fatty alcohol polyoxyethylene ether, polyoxyethylene fatty acid ester, polyoxyethylene amine, alkanolamide, polyoxyethylene lauryl ether, C12-14 primary alcohol polyoxyethylene ether, C12-14 secondary alcohol polyoxyethylene ether, branched C13 Guerbet alcohol polyoxyethylene ether, branched C10 Guerbet alcohol polyoxyethylene, linear C10 alcohol polyoxyethylene ether, linear C8 octanol polyoxyethylene ether, linear C8 isooctanol polyoxyethylene ether, fatty acid monoglyceride, glycerin monostearate, fatty acid sorbitan ester, composite silicone polyether compound, polysorbate, polyoxyethylene fatty acid ester, polyoxyethylene fatty alcohol ether, polyoxyethylene-polyoxypropylene block copolymer, polyether modified trisiloxane or polyether modified organosilicon polyether siloxane.

According to some embodiments of the present application, the electrolyte contains ethylene carbonate, and the content X mg of the ethylene carbonate in the electrolyte and the reaction area Y $m^2$ of the anode active material layer meet the following relation: $10 \leq (X/Y) \leq 100$.

According to some embodiments of the present application, the electrolyte further contains a compound of Formula 1:

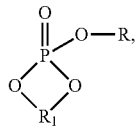

Formula 1 wherein R is linear or non-linear alkyl having 1 to 5 carbon atoms or —SiR$_2$R$_3$R$_4$, wherein R$_2$, R$_3$ and R$_4$ are each independently alkyl having 1 to 5 carbon atoms, and R$_1$ is alkylene having 2 to 3 carbon atoms and substituted with a substituent selected from: at least one fluorine atom or alkyl containing at least one fluorine atom and having 1 to 3 carbon atoms.

According to some embodiments of the present application, in Formula 1, R is —SiR$_2$R$_3$R$_4$, and R$_1$ is alkylene having 2 carbon atoms and substituted with a substituent selected from: at least one fluorine atom or alkyl containing at least one fluorine atom and having 1 to 3 carbon atoms.

According to some embodiments of the present application, the compound of Formula 1 includes at least one of the compounds represented by Formula 1a to Formula 1h:

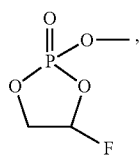

1a

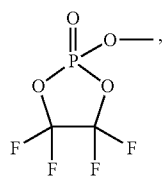

1b

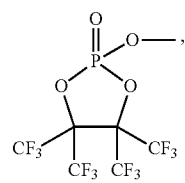

1c

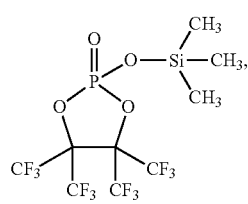

1d

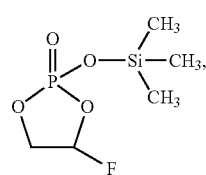

1e

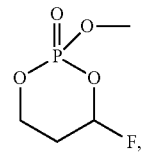

1f

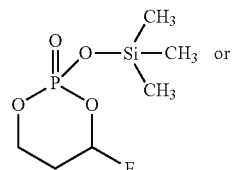

1g

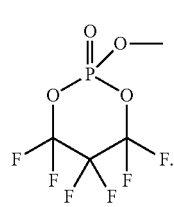

1h

According to some embodiments of the present application, based on the total weight of the electrolyte, the content of the compound of Formula 1 is 0.001 wt % to 10 wt %.

According to some embodiments of the present application, the electrolyte further contains a difluorophosphate and an iron group element, the iron group element includes a cobalt element, a nickel element or a combination thereof, and based on the total weight of the electrolyte, the content of the iron group element is not greater than 0.05 wt %.

In another aspect of the present application, the present application provides an electronic device, including the electrochemical device according to the present application.

Additional aspects and advantages of the embodiments of the present application will be described or shown in the following description or interpreted by implementing the embodiments of the present application.

DETAILED DESCRIPTION

Embodiments of the present application will be described in detail below. The embodiments of the present application should not be interpreted as limitations to the present application.

Unless otherwise expressly indicated, the following terms used herein have the meanings indicated below.

In the detailed description and claims, a list of items connected by the term "at least one of" or other similar terms may mean any combination of the listed items. For example, if items A and B are listed, then the phrase "at least one of A and B" means only A; only B; or A and B. In another example, if items A, B and C are listed, then the phrase "at least one of A, B and C" means only A; only B; only C; A and B (excluding C); A and C (excluding B); B and C (excluding A); or all of A, B and C. Item A may include a single element or multiple elements. Item B may include a single element or multiple elements. Item C may include a single element or multiple elements.

As used herein, the term "alkyl" is intended to be a linear saturated hydrocarbon structure having 1 to 20 carbon atoms. "Alkyl" is also intended to be a branched or cyclic hydrocarbon structure having 3 to 20 carbon atoms. When an alkyl having a specific carbon number is specified, it is intended to cover all geometric isomers having that carbon number; therefore, for example, "butyl" means to include n-butyl, sec-butyl, isobutyl, tert-butyl and cyclobutyl; and "propyl" includes n-propyl, isopropyl and cyclopropyl. Examples of alkyl include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornyl and the like.

As used herein, the term "alkylene" refers to a divalent saturated hydrocarbyl that may be linear or branched. Unless otherwise defined, the alkylene typically contains 2 to 10 carbon atoms and includes (for example) —$C_{2-3}$ alkylene and —$C_{2-6}$ alkylene-. Representative alkylene includes (for example) methylene, ethane-1,2-diyl ("ethylene"), propane-1,2-diyl, propane-1,3-diyl, butane-1,4-diyl, pentane-1,5-diyl and the like.

The theoretical capacity of an electrochemical device (for example, a lithium-ion battery) may vary with the type of the anode active material. As the cycle progresses, the electrochemical device generally has a decrease in charge/discharge capacity. This is because the electrode interface of the electrochemical device varies during charging and/or discharging, resulting in that the electrode active material cannot perform its function.

The present application ensures the interface stability of the electrochemical device during the cycle by using a combination of a specific anode material and a specific electrolyte, thereby enhancing the cycle performance of the electrochemical device. The specific anode material of the present application is achieved by controlling the contact angle of the surface of the anode active material layer. As a control method of the contact angle, the contact angle may be controlled by adding an auxiliary agent to an anode slurry or disposing an auxiliary agent coating on the surface of the anode active material layer.

In one embodiment, the present application provides an electrochemical device, including a cathode, an anode and an electrolyte as described below.

I. Anode

The anode includes an anode current collector and an anode active material layer disposed on one or two surfaces of the anode current collector.

1. Anode Active Material Layer

The anode active material layer includes an anode active material. The anode active material layer may have one or multiple layers, and each of the multiple anode active material layers may include the same or different anode active materials. The anode active material is any material that can reversibly intercalate and deintercalate metal ions such as lithium ions. In some embodiments, the chargeable capacity of the anode active material is greater than the discharge capacity of a cathode active material to prevent lithium metal from unintentionally precipitating on the anode during charging.

(1) Contact Angle

One feature of the electrochemical device of the present application is that the contact angle of the anode active material layer relative to a non-aqueous solvent is not greater than 60° as measured by a contact angle measurement. In some embodiments, the contact angle of the anode active material layer relative to a non-aqueous solvent is not greater than 50° as measured by a contact angle measurement. In some embodiments, the contact angle of the anode active material layer relative to a non-aqueous solvent is not greater than 30° as measured by a contact angle measurement. When the anode active material layer has the above-mentioned contact angle relative to the non-aqueous solvent, the interface of the anode active material layer has fewer defects, has good stability in the charge and discharge cycle of the electrochemical device, and can ensure the cycle performance of the electrochemical device.

The contact angle of the anode active material layer relative to the non-aqueous solvent may reflect surface properties of the anode active material layer, and is one of physicochemical parameters that characterize the anode active material layer. The smaller the contact angle, the smoother the surface of the anode active material layer and the fewer the pinhole or pit defects, so that the cycle performance of the electrochemical device can be significantly improved. The contact angle of the anode active material layer relative to the non-aqueous solvent may be affected by multiple factors, including the auxiliary agent, the porosity of the anode active material layer and the like.

According to some embodiments of the present application, the contact angle measurement means that after a 3-microliter droplet of diethyl carbonate is dropwise added to the surface of the anode active material layer, the contact angle of the droplet on the surface of the anode active material layer is tested within 100 seconds.

According to some embodiments of the present application, the droplet diameter of the non-aqueous solvent on the anode active material layer is not greater than 30 mm as measured by a contact angle measurement. In some embodiments, the droplet diameter of the non-aqueous solvent on the anode active material layer is not greater than 20 mm as measured by a contact angle measurement. In some embodiments, the droplet diameter of the non-aqueous solvent on the anode active material layer is not greater than 15 mm as measured by a contact angle measurement. In some embodiments, the droplet diameter of the non-aqueous solvent on the anode active material layer is not greater than 10 mm as measured by a contact angle measurement. When the anode active material layer has the above-mentioned contact angle relative to the non-aqueous solvent and at the same time the non-aqueous solvent has the above-mentioned droplet diameter, the cycle performance of the electrochemical device is further enhanced.

The contact angle of the anode active material layer relative to the non-aqueous solvent and the droplet diameter of the non-aqueous solvent can be measured by the following method: 3 microliters of diethyl carbonate are dropwise added to the surface of the anode active material layer, the droplet diameter is tested by using a JC2000D3E contact angle measuring instrument within 100 seconds, and a 5-point fitting method (that is, 2 points on the left and right planes of the droplet are taken first to determine a liquid-solid interface, and then 3 points are taken on the arc of the droplet) is used for fitting to obtain the contact angle of the anode active material layer relative to the non-aqueous solvent. Each sample is measured at least 3 times, and at least 3 data samples with a difference of less than 5° are selected and averaged to obtain the contact angle of the anode active material layer relative to the non-aqueous solvent.

The non-aqueous solvent used in the contact angle test may be diethyl carbonate, ethyl methyl carbonate, dimethyl carbonate, methyl propyl carbonate, methyl isopropyl carbonate or other common electrolyte solvents.

(2) Porosity

According to some embodiments of the present application, the porosity of the anode active material layer is 10% to 60%. In some embodiments, the porosity of the anode active material layer is 15% to 50%. In some embodiments, the porosity of the anode active material layer is 20% to 40%. In some embodiments, the porosity of the anode active material layer is 25% to 30%. In some embodiments, the porosity of the anode active material layer is 10%, 15%, 20%, 25%, 30%, 35%, 40%, 45%, 50%, 55%, 60% or within a range formed by any two of the above values.

The porosity of the anode active material layer may be measured by the following method: a AccuPyc II 1340 true density tester is used for testing, each sample is measured at least 3 times, and at least 3 data samples are selected and averaged. The porosity of the anode active material layer is calculated according to the following formula: porosity=(V1−V2)/V1×100%, wherein V1 is the apparent volume, V1=sample surface area×sample thickness×number of samples; V2 is the true volume.

(3) Carbon Material

According to some embodiments of the present application, the anode active material layer includes a carbon material.

According to some embodiments of the present application, the anode active material layer includes at least one of artificial graphite, natural graphite, mesophase carbon microspheres, soft carbon, hard carbon and amorphous carbon.

According to some embodiments of the present application, the carbon material has amorphous carbon on the surface.

According to some embodiments of the present application, the shape of the carbon material includes, but is not limited to, fibrous, spherical, granular, and scaly.

According to some embodiments of the present application, the carbon material has at least one of the following features:

(a) a specific surface area (BET) of less than 5 m$^2$/g; and
(b) a median particle size (D50) of 5 μm to 30 μm.

Specific Surface Area (BET)

In some embodiments, the carbon material has a specific surface area of less than 5 m$^2$/g. In some embodiments, the carbon material has a specific surface area of less than 3 m$^2$/g. In some embodiments, the carbon material has a specific surface area of less than 1 m$^2$/g. In some embodiments, the carbon material has a specific surface area of greater than 0.1 m$^2$/g. In some embodiments, the carbon material has a specific surface area of less than 0.7 m$^2$/g. In some embodiments, the carbon material has a specific surface area of less than 0.5 m$^2$/g. In some embodiments, the specific surface area of the carbon material is within a range formed by any two of the above values. When the specific surface area of the carbon material is within the above range, the precipitation of lithium on the electrode surface can be suppressed, and the production of gas caused by the reaction of the anode and the electrolyte can be suppressed.

The specific surface area of the anode active material layer may be measured by the following method: a surface area meter (a full automatic surface area measuring device manufactured by Okura Riken) is used, the sample is pre-dried at 350° C. for 15 minutes under nitrogen flow, and then a nitrogen-helium mixed gas of which the relative pressure value of nitrogen relative to atmospheric pressure is accurately adjusted to 0.3 is used for measurement by a nitrogen adsorption BET single-point method using a gas flow method.

Median Particle Size (D50)

The median particle size (D50) of the carbon material refers to a volume-based average particle size obtained by a laser diffraction/scattering method. In some embodiments, the carbon material has a median particle size (D50) of 5 μm to 30 μm. In some embodiments, the carbon material has a median particle size (D50) of 10 μm to 25 μm. In some embodiments, the carbon material has a median particle size (D50) of 15 μm to 20 μm. In some embodiments, the carbon material has a median particle size (D50) of 1 μm, 3 μm, 5 μm, 7 μm, 10 μm, 15 μm, 20 μm, 25 μm, 30 μm or within a range formed by any two of the above values. When the median particle size of the carbon material is within the above range, the irreversible capacity of the electrochemical device is small, and the anode can be easily coated uniformly.

The median particle size (D50) of the carbon material may be measured by the following method: the carbon material is dispersed in a 0.2 wt % aqueous solution (10 mL) of polyoxyethylene (20) sorbitan monolaurate, and a HORIBA LA-700 laser diffraction/scattering particle size distribution meter is used for testing.

X-Ray Diffraction Pattern Parameters

According to some embodiments of the present application, based on an X-ray diffraction pattern of the Gakushin method, an interlayer distance of the lattice plane (002 plane) of the carbon material is within a range of 0.335 nm to 0.360 nm, within a range of 0.335 nm to 0.350 nm or within a range of 0.335 nm to 0.345 nm.

According to some embodiments of the present application, based on an X-ray diffraction pattern of the Gakushin method, a crystallite size (Lc) of the carbon material is greater than 1.0 nm or greater than 1.5 nm.

Raman Spectrum Parameters

In some embodiments, the Raman R value of the carbon material is greater than 0.01, greater than 0.03 or greater than 0.1 In some embodiments, the Raman R value of the carbon material is less than 1.5, less than 1.2, less than 1.0 or less than 0.5 In some embodiments, the Raman R value of the carbon material is within a range formed by any two of the above values.

The Raman half-peak width of the carbon material near 1580 cm$^{-1}$ is not particularly limited. In some embodiments, the Raman half-peak width of the carbon material near 1580 cm$^{-1}$ is greater than 10 cm$^{-1}$ or greater than 15 cm$^{-1}$. In some embodiments, the Raman half-peak width of the carbon material near 1580 cm$^{-1}$ is less than 100 cm$^{-1}$, less than 80 cm$^{-1}$, less than 60 cm$^{-1}$ or less than 40 cm$^{-1}$. In some embodiments, the Raman half-peak width of the carbon material near 1580 cm-1 is within a range formed by any two of the above values.

The Raman R value and Raman half-peak width are indicators indicating crystallinity of a carbon material surface. Moderate crystallinity can maintain interlayer sites containing lithium in the carbon material during charging and discharging and prevent them from disappearing, which is beneficial to the chemical stability of the carbon material.

When the Raman R value and/or the Raman half-peak width is within the range described above, the carbon material can form an appropriate coating on the surface of the anode, which helps to improve the storage characteristics, cycle characteristics and load characteristics of the electrochemical device. At the same time, a decrease in efficiency and production of gas caused by a reaction between the carbon material and the electrolyte can be suppressed.

The Raman R value or the Raman half-peak width may be measured by argon ion laser Raman spectroscopy: using a JASCO Raman spectroscope, a sample is naturally dropped and fed in a measuring cell, the surface of the sample in the cell is irradiated with an argon ion laser while the cell is rotated in a plane perpendicular to the laser, and thereby, the measurement is performed. For the obtained Raman spectrum, the intensity IA of a peak PA near 1580 cm$^{-1}$ and the intensity IB of a peak PB near 1360 cm$^{-1}$ are measured, and an intensity ratio R (R=IB/IA) is calculated.

Measurement conditions of the above Raman spectroscopy are as follows:

Argon ion laser wavelength: 514.5 nm
Laser power on sample: 15-25 mW
Resolution: 10-20 cm$^{-1}$
Measurement range: 1100 cm$^{-1}$-1730 cm$^{-1}$
Raman R value and Raman half-peak width analysis: background processing
Smoothing: simple average, convolution 5 points Roundness The definition of "roundness" is as follows: roundness=(perimeter of equivalent circle having the same area as particle projected shape)/(actual perimeter of particle projected shape). When the roundness is 1.0, it is a theoretical sphere.

In some embodiments, the particle size of the carbon material is 3 μm to 40 μm, and the roundness is greater than 0.1, greater than 0.5, greater than 0.8, greater than 0.85 or greater than 0.9, or is 1.0.

For high-current-density charge and discharge characteristics, the greater the roundness of the carbon material, the higher the packing properties, which helps to suppress the resistance between particles, thereby improving the charge and discharge characteristics of the electrochemical device under high current density.

The roundness of the carbon material may be measured using a Sysmex flow particle image analyzer: 0.2 g of sample is dispersed in a 0.2 wt % aqueous solution (50 mL) of polyoxyethylene (20) sorbitan monolaurate, and irradiated with ultrasonic waves of 28 kHz at an output power of 60 W for 1 minute, a detection range is specified to 0.6 μm to 400 μm, and particles with a particle size ranging from 3 μm to 40 μm are measured.

The method of increasing the roundness is not particularly limited. Spheroidization may be used to make the shape of voids between carbon material particles uniform in the preparation of the electrode. The spheroidization may be implemented by a mechanical means such as by applying a shearing force or compressive force, or by applying a binder or by a mechanical/physical means such as by granulating a plurality of particles by the adhesive force of the particles themselves, so that the carbon material particles are nearly spherical.

Tap Density

In some embodiments, the tap density of the carbon material is greater than 0.1 g/cm$^3$, greater than 0.5 g/cm$^3$, greater than 0.7 g/cm$^3$ or greater than 1 g/cm$^3$. In some embodiments, the tap density of the carbon material is less than 2 g/cm$^3$, less than 1.8 g/cm$^3$ or less than 1.6 g/cm$^3$. In some embodiments, the tap density of the carbon material is within a range formed by any two of the above values. When the tap density of the carbon material is within the above range, the capacity of the electrochemical device can be ensured, and at the same time, the increase in resistance between the carbon material particles can be suppressed.

The tap density of the carbon material may be tested by the following method: after the sample passes through a sieve with a mesh size of 300 μm, it drops into a 20 cm$^3$ tapping tank until the upper end surface of the tank is filled with the sample, a powder density measuring device (for example, a Seishin tap sensor) is used to perform 1000 vibrations with a stroke length of 10 mm, and the tap density is calculated according to the mass at this time and the mass of the sample.

Orientation Ratio

In some embodiments, the orientation ratio of the carbon material is greater than 0.005, greater than 0.01 or greater than 0.015. In some embodiments, the orientation ratio of the carbon material is less than 0.67. In some embodiments, an orientation ratio of the carbon material is within a range formed by any two of the above values. When the orientation ratio of the carbon material is within the above range, the electrochemical device can have excellent high-density charge and discharge characteristics.

The orientation ratio of the carbon material may be measured by X-ray diffraction after performing extrusion forming on the sample: 0.47 g of the sample is fed into a forming machine with a diameter of 17 mm and compressed under 58.8 MN·m$^{-2}$ to obtain a formed body, the formed body is fixed with clay such that the formed body and the surface of a sample holder for measurement are on the same plane, and thereby, a X-ray diffraction measurement is performed. The ratio represented by (110) diffraction peak intensity/(004) diffraction peak intensity is calculated from the obtained peak intensities of (110) diffraction and (004) diffraction of carbon.

X-ray diffraction measurement conditions are as follows:
Target: Cu (Kα ray) graphite monochromator
Slits: divergence slit=0.5 degrees; light receiving slit=0.15 mm; scatter slit=0.5 degrees
Measuring range and step angle/measurement time ("2θ" represents the diffraction angle):
(110) plane: 75 degrees≤2θ≤80 degrees 1 degree/60 seconds
(004) plane: 52 degrees≤2θ≤57 degrees 1 degree/60 seconds Length-to-Thickness Ratio In some embodiments, the length-to-thickness ratio of the carbon material is greater than 1, greater than 2 or greater than 3 In some embodiments, the length-to-thickness ratio of the carbon material is less than 10, less than 8 or less than 5 In some embodiments, the length-to-thickness ratio of the carbon material is within a range formed by any two of the above values.

When the length-to-thickness ratio of the carbon material is within the above range, the coating can be performed more uniformly, and thus the electrochemical device can have excellent high-current-density charge and discharge characteristics.

(4) Trace Elements

According to some embodiments of the present application, the anode active material layer further includes at least one metal of molybdenum, iron and copper. These metal elements may react with some organic substances with poor conducting power in the anode active material, thereby facilitating the film formation on the surface of the anode active material.

According to some embodiments of the present application, the above metal elements are present in the anode active material layer in a trace amount, and excessive metal elements easily form non-conductive by-products adhered to the surface of the anode. In some embodiments, based on the total weight of the anode active material layer, the content of the at least one metal is not greater than 0.05 wt %. In some embodiments, the content of the at least one metal is not greater than 0.03 wt %. In some embodiments, the content of the at least one metal is not greater than 0.01 wt %.

(5) Auxiliary Agent

According to some embodiments of the present application, the anode active material layer further includes an auxiliary agent.

According to some embodiments of the present application, the auxiliary agent has at least one of the following features:
(a) an oxidation potential of not less than 4.5 V, and a reduction potential of not greater than 0.5 V;
(b) a surface tension of not greater than 30 mN/m;
(c) a nonionic surfactant is included;
(d) based on the total weight of the anode active material layer, the content of the auxiliary agent is not greater than 3000 ppm.

Oxidation/Reduction Potential

In some embodiments, the auxiliary agent has an oxidation potential of not less than 4.5 V and a reduction potential of not greater than 0.5 V. In some embodiments, the auxiliary agent has an oxidation potential of not less than 5 V and a reduction potential of not greater than 0.3 V. The auxiliary agent having the above oxidation/reduction potential has stable electrochemical performance, which helps to improve the cycle performance of the electrochemical device.

Surface Tension

In some embodiments, the surface tension of the auxiliary agent is not greater than 30 mN/m. In some embodiments, the surface tension of the auxiliary agent is not greater than 25 mN/m. In some embodiments, the surface tension of the auxiliary agent is not greater than 20 mN/m. In some embodiments, the surface tension of the auxiliary agent is not greater than 15 mN/m. In some embodiments, the surface tension of the auxiliary agent is not greater than 10 mN/m. The surface tension of the auxiliary agent is measured under the condition of an auxiliary agent aqueous solution with a solid content of 1%. The auxiliary agent having the surface tension as described above makes the anode active material layer have a good interface, which helps to improve the cycle performance of the electrochemical device.

The surface tension of the auxiliary agent may be measured by the following method: a JC2000D3E contact angle measuring instrument is used to test an auxiliary agent aqueous solution with a solid content of 1%, each sample is tested at least 3 times, and at least 3 data samples are selected and averaged to obtain the surface tension of the auxiliary agent.

Nonionic Surfactant

In some embodiments, the auxiliary agent includes a nonionic surfactant, and the nonionic surfactant includes at least one of polyoxyethylene ether, polyol ester, amide or block polyether.

In some embodiments, the nonionic surfactant includes at least one of the following: polyoxyethylene alkanolamide, octyl phenol polyoxyethylene ether, nonyl phenol polyoxyethylene ether, high carbon fatty alcohol polyoxyethylene ether, polyoxyethylene fatty acid ester, polyoxyethylene amine, alkanolamide, polyoxyethylene lauryl ether, C12-14 primary alcohol polyoxyethylene ether, C12-14 secondary alcohol polyoxyethylene ether, branched C13 Guerbet alcohol polyoxyethylene ether, branched C10 Guerbet alcohol polyoxyethylene, linear C10 alcohol polyoxyethylene ether, linear C8 octanol polyoxyethylene ether, linear C8 isooctanol polyoxyethylene ether, fatty acid monoglyceride, glycerin monostearate, fatty acid sorbitan ester, composite silicone polyether compound, polysorbate, polyoxyethylene fatty acid ester, polyoxyethylene fatty alcohol ether, polyoxyethylene-polyoxypropylene block copolymer, polyether modified trisiloxane or polyether modified organosilicon polyether siloxane.

Auxiliary Agent Content

In some embodiments, based on the total weight of the anode active material layer, the content of the auxiliary agent is not greater than 2,500 ppm. In some embodiments, based on the total weight of the anode active material layer, the content of the auxiliary agent is not greater than 2000 ppm. In some embodiments, based on the total weight of the anode active material layer, the content of the auxiliary agent is not greater than 1500 ppm. In some embodiments, based on the total weight of the anode active material layer, the content of the auxiliary agent is not greater than 1000 ppm. In some embodiments, based on the total weight of the anode active material layer, the content of the auxiliary agent is not greater than 500 ppm. In some embodiments, based on the total weight of the anode active material layer, the content of the auxiliary agent is not greater than 200 ppm. The auxiliary agent having the above content helps to improve the following characteristics of the electrochemical device: output power characteristics, load characteristics, low-temperature characteristics, cycle characteristics, high-temperature storage characteristics and the like.

(6) Other Components

Silicon and/or Tin-Containing Materials

According to some embodiments of the present application, the anode active material layer further includes at least one of a silicon-containing material, a tin-containing material and an alloy material. According to some embodiments of the present application, the anode active material layer further includes at least one of a silicon-containing material and a tin-containing material. In some embodiments, the anode active material layer further includes one or more of a silicon-containing material, a silicon-carbon composite material, a silicon-oxygen material, an alloy material and a lithium-containing metal composite oxide material. In some embodiments, the anode active material layer further includes other types of anode active materials, for example, one or more materials including metal elements and metalloid elements capable of forming an alloy with lithium. In some embodiments, examples of the metal elements and metalloid elements include, but are not limited to, Mg, B, Al, Ga, In, Si, Ge, Sn, Pb, Bi, Cd, Ag, Zn, Hf, Zr, Y, Pd and Pt. In some embodiments, examples of the metal elements and metalloid elements include Si, Sn or a combination thereof. Si and Sn have excellent ability to deintercalate lithium ions, which can provide high energy density for lithium-ion batteries. In some embodiments, other types of anode active materials may further include one or more of metal oxides and a high-molecular compound. In some embodiments, the metal oxides include, but are not limited to, iron oxide, ruthenium oxide and molybdenum oxide. In some embodiments, the high-molecular compound includes, but is not limited to, polyacetylene, polyaniline and polypyrrole.

Anode Conductive Material

In some embodiments, the anode active material layer further includes an anode conductive material, and the conductive material may include any conductive material as long as it does not cause chemical changes. Non-limiting examples of the conductive material include carbon-based materials (for example, natural graphite, artificial graphite, carbon black, acetylene black, Ketjen black, carbon fibers and the like), conductive polymers (for example, polyphenylene derivatives) and mixtures thereof Anode Binder In some embodiments, the anode active material layer further includes an anode binder. The anode binder can enhance the binding of the anode active material particles to each other and the binding of the anode active material and the current collector. The type of the anode binder is not particularly limited, as long as it is a material that is stable with the electrolyte or the solvent used in the manufacture of the electrode.

Examples of the anode binder include, but are not limited to, resin polymers such as polyethylene, polypropylene, polyethylene terephthalate, polymethyl methacrylate, aromatic polyamide, polyimide, cellulose, nitrocellulose and the like; rubber-like polymers such as styrene-butadiene rubber (SBR), isoprene rubber, butadiene rubber, fluororubber, acrylonitrile-butadiene rubber (NBR), ethylene-propylene rubber and the like; styrene-butadiene-styrene block copolymer or a hydride thereof; thermoplastic elastomer-like polymers such as ethylene-propylene-diene terpolymer (EPDM), styrene-ethylene-butadiene-styrene copolymer, styrene-isoprene-styrene block copolymer or hydrides thereof and the like; soft resin-like polymers such as syndiotactic-1,2-polybutadiene, polyvinyl acetate, ethylene-vinyl acetate copolymer, propylene-α-olefin copolymer and the like; fluorine polymers such as polyvinylidene fluoride, polytetrafluoroethylene, fluorinated polyvinylidene fluoride, polytetrafluoroethylene-ethylene copolymer and the like; and polymer compositions having ion conductivity of alkali metal ions (for example, lithium ions), and the like. The above anode binders may be used alone or in any combination.

In some embodiments, based on the total weight of the anode active material layer, the content of the anode binder is greater than 0.1 wt %, greater than 0.5 wt % or greater than 0.6 wt %. In some embodiments, based on the total weight of the anode active material layer, the content of the anode binder is less than 20 wt %, less than 15 wt %, less than 10 wt % or less than 8 wt %. In some embodiments, the content of the anode binder is within a range formed by any two of the above values. When the content of the anode binder is within the above range, the capacity of the electrochemical device and the strength of the anode can be sufficiently ensured.

In the case where the anode active material layer contains the rubber-like polymer (for example, SBR), in some embodiments, based on the total weight of the anode active material layer, the content of the anode binder is greater than 0.1 wt %, greater than 0.5 wt % or greater than 0.6 wt %. In some embodiments, based on the total weight of the anode active material layer, the content of the anode binder is less than 5 wt %, less than 3 wt % or less than 2 wt %. In some embodiments, based on the total weight of the anode active material layer, the content of the anode binder is within a range formed by any two of the above values.

In the case where the anode active material layer contains the fluorine polymer (for example, polyvinylidene fluoride), in some embodiments, based on the total weight of the anode active material layer, the content of the anode binder is greater than 1 wt %, greater than 2 wt % or greater than 3 wt %. In some embodiments, based on the total weight of the anode active material layer, the content of the anode binder is less than 15 wt %, less than 10 wt % or less than 8 wt %. Based on the total weight of the anode active material layer, the content of the anode binder is within a range formed by any two of the above values.

Solvent

The type of the solvent for forming an anode slurry is not particularly limited as long as it is a solvent that can dissolve or disperse the anode active material, the anode binder, and the thickener and conductive material used as necessary. In some embodiments, the solvent for forming the anode slurry may be any one of aqueous solvents and organic solvents. Examples of the aqueous solvents may include, but are not limited to, water, alcohol and the like. Examples of the organic solvents may include, but are not limited to, N-methylpyrrolidone (NMP), dimethylformamide, dimethylacetamide, methyl ethyl ketone, cyclohexanone, methyl acetate, methyl acrylate, diethyltriamine, N N-dimethylaminopropylamine, tetrahydrofuran (THF), toluene, acetone, diethyl ether, hexamethylphosphoramide, dimethyl sulfoxide, benzene, xylene, quinoline, pyridine, methylnaphthalene, hexane and the like. The above solvents may be used alone or in any combination.

Thickener

A thickener is typically used to adjust the viscosity of an anode slurry. The type of the thickener is not particularly limited, and examples thereof may include, but are not limited to, carboxymethyl cellulose, methyl cellulose, hydroxymethyl cellulose, ethyl cellulose, polyvinyl alcohol, oxidized starch, phosphated starch, casein and salts thereof, and the like. The above thickeners may be used alone or in any combination.

In some embodiments, based on the total weight of the anode active material layer, the content of the thickener is greater than 0.1 wt %, greater than 0.5 wt % or greater than 0.6 wt %. In some embodiments, based on the total weight of the anode active material layer, the content of the thickener is less than 5 wt %, less than 3 wt % or less than 2 wt %. When the content of the thickener is within the above range, a decrease in the capacity of the electrochemical device and an increase in the resistance can be suppressed, and at the same time, good coatability of the anode slurry can be ensured.

Surface Coating

In some embodiments, the surface of the anode active material layer may have a material different from its adhered composition. Examples of the surface-adhered material of the anode active material layer include, but are not limited to, aluminum oxide, silicon dioxide, titanium dioxide, zirconium oxide, magnesium oxide, calcium oxide, boron oxide, antimony oxide, bismuth oxide and other oxides, lithium sulfate, sodium sulfate, potassium sulfate, magnesium sulfate, calcium sulfate, aluminum sulfate and other sulfates, lithium carbonate, calcium carbonate, magnesium carbonate and other carbonates, and the like.

(7) Content of Anode Active Material

In some embodiments, based on the total weight of the anode active material layer, the content of the anode active material is greater than 80 wt %, greater than 82 wt % or greater than 84 wt %. In some embodiments, based on the total weight of the anode active material layer, the content of the anode active material is less than 99 wt % or less than 98 wt %. In some embodiments, based on the total weight of the anode active material layer, the content of the anode active material is within a range formed by any two of the above values.

(8) Thickness of Anode Active Material Layer

The thickness of the anode active material layer refers to the thickness of the anode active material layer on any one side of an anode current collector. In some embodiments, the thickness of the anode active material layer is greater than 15 μm, greater than 20 μm or greater than 30 μm. In some embodiments, the thickness of the anode active material layer is less than 300 μm, less than 280 μm or less than 250 μm. In some embodiments, the thickness of the anode active material layer is within a range formed by any two of the above values.

(9) Density of Anode Active Material

In some embodiments, the density of the anode active material in the anode active material layer is greater than 1 g/cm$^3$, greater than 1.2 g/cm$^3$ or greater than 1.3 g/cm$^3$. In some embodiments, the density of the anode active material in the anode active material layer is less than 2.2 g/cm$^3$, less than 2.1 g/cm$^3$, less than 2.0 g/cm$^3$ or less than 1.9 g/cm$^3$. In some embodiments, the density of the anode active material in the anode active material layer is within a range formed by any two of the above values.

When the density of the anode active material is within the above range, damage to the anode active material particles can be prevented, the deterioration of the high-current-density charge and discharge characteristics caused by an increase in the initial irreversible capacity of the electrochemical device or a decrease in the permeability of the electrolyte near the anode current collector/anode active material interface can be suppressed, and a decrease in the capacity of the electrochemical device and an increase in the resistance can be suppressed.

2. Anode Current Collector

As a current collector maintaining the anode active material, a well-known current collector may be used arbitrarily. Examples of the anode current collector include, but are not limited to, aluminum, copper, nickel, stainless steel, nickel-plated steel and other metal materials. In some embodiments, the anode current collector is copper.

In the case where the anode current collector is a metal material, the form of the anode current collector may include, but is not limited to, metal foil, a metal cylinder, a metal tape coil, a metal plate, a metal film, expanded metal, stamped metal, foam metal and the like. In some embodiments, the anode current collector is a metal film. In some embodiments, the anode current collector is copper foil. In some embodiments, the anode current collector is rolled copper foil based on a rolling method or electrolytic copper foil based on an electrolytic method.

In some embodiments, the thickness of the anode current collector is greater than 1 μm or greater than 5 μm. In some embodiments, the thickness of the anode current collector is less than 100 μm or less than 50 μm. In some embodiments, the thickness of the anode current collector is within a range formed by any two of the above values.

The thickness ratio of the anode current collector to the anode active material layer refers to a ratio of the thickness of the single-sided anode active material layer to the thickness of the anode current collector before the injection of the electrolyte, and the value is not particularly limited. In some embodiments, the thickness ratio of the anode current collector to the anode active material layer is less than 150, less than 20 or less than 10. In some embodiments, the thickness ratio of the anode current collector to the anode active material layer is greater than 0.1, greater than 0.4 or greater than 1 In some embodiments, the thickness ratio of the anode current collector to the anode active material layer is within a range formed by any two of the above values. When the thickness ratio of the anode current collector to the anode active material layer is within the above range, the capacity of the electrochemical device can be ensured, and at the same time, the heat release of the anode current collector during high-current-density charge and discharge can be suppressed.

II. Electrolyte

The electrolyte used in the electrochemical device of the present application includes an electrolyte and a solvent that dissolves the electrolyte. In some embodiments, the electrolyte used in the electrochemical device of the present application further includes an additive.

According to some embodiments of the present application, the electrolyte contains ethylene carbonate, and the content X mg of the ethylene carbonate in the electrolyte and the reaction area Y m$^2$ of the anode active material layer meet the following relation: $10 \leq (X/Y) \leq 100$. In some embodiments, X and Y meet the following relation: $10 \leq (X/Y) < 100$. In some embodiments, X and Y meet the following relation: $20 \leq (X/Y) < 70$.

According to some embodiments of the present application, the electrolyte further contains a compound of Formula 1:

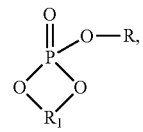

Formula 1 wherein R is linear or non-linear alkyl having 1 to 5 carbon atoms or —SiR$_2$R$_3$R$_4$, wherein R$_2$, R$_3$ and R$_4$ are each independently alkyl having 1 to 5 carbon atoms, and R$_1$ is alkylene having 2 to 3 carbon atoms and substituted with a substituent selected from: at least one fluorine atom or alkyl containing at least one fluorine atom and having 1 to 3 carbon atoms.

According to some embodiments of the present application, in Formula 1, R is —SiR$_2$R$_3$R$_4$, and R$_1$ is alkylene having 2 carbon atoms and substituted with a substituent selected from: at least one fluorine atom or alkyl containing at least one fluorine atom and having 1 to 3 carbon atoms.

According to some embodiments of the present application, the compound of Formula 1 includes at least one of the compounds represented by Formula 1a to Formula 1h:

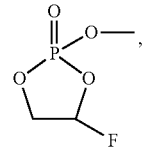

1a

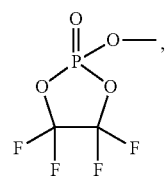

1b

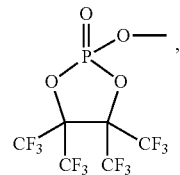

1c

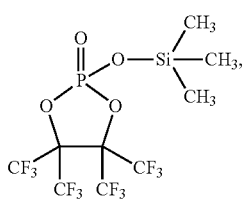

1d

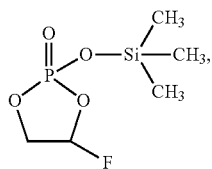

1e

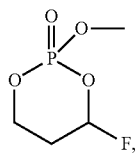

1f

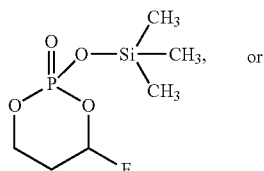

1g

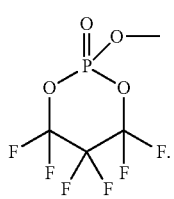

1h

According to some embodiments of the present application, based on the total weight of the electrolyte, the content of the compound of Formula 1 is 0.001 wt % to 10 wt %. In some embodiments, based on the total weight of the electrolyte, the content of the compound of Formula 1 is 0.005 wt % to 9 wt %. In some embodiments, based on the total weight of the electrolyte, the content of the compound of Formula 1 is 0.01 wt % to 8 wt %. In some embodiments, based on the total weight of the electrolyte, the content of the compound of Formula 1 is 0.05 wt % to 7 wt %. In some embodiments, based on the total weight of the electrolyte, the content of the compound of Formula 1 is 0.1 wt % to 6 wt %. In some embodiments, based on the total weight of the electrolyte, the content of the compound of Formula 1 is 0.5 wt % to 5 wt %. In some embodiments, based on the total weight of the electrolyte, the content of the compound of Formula 1 is 1 wt % to 4 wt %. In some embodiments, based on the total weight of the electrolyte, the content of the compound of Formula 1 is 2 wt % to 3 wt %.

According to some embodiments of the present application, the electrolyte further contains a difluorophosphate and an iron group element, the iron group element includes a cobalt element, a nickel element or a combination thereof, and based on the total weight of the electrolyte, the content of the iron group element is not greater than 0.05 wt %. In some embodiments, based on the total weight of the electrolyte, the content of the iron group element is not greater than 0.03 wt %. In some embodiments, based on the total weight of the electrolyte, the content of the iron group element is not greater than 0.02 wt %. In some embodiments, based on the total weight of the electrolyte, the content of the iron group element is not greater than 0.01 wt %. In some embodiments, based on the total weight of the electrolyte, the content of the iron group element is not greater than 0.005 wt %. In some embodiments, based on the total weight of the electrolyte, the content of the iron group element is not greater than 0.004 wt %. In some embodiments, based on the total weight of the electrolyte, the content of the iron group element is not greater than 0.002 wt %.

In some embodiments, the electrolyte further includes any non-aqueous solvent known in the prior art as a solvent of the electrolyte.

In some embodiments, the non-aqueous solvent includes, but is not limited to, one or more of the following: a cyclic carbonate, a chain carbonate, a cyclic carboxylate, a chain carboxylate, a cyclic ether, a chain ether, a phosphorus-containing organic solvent, a sulfur-containing organic solvent and an aromatic fluorine-containing solvent.

In some embodiments, examples of the cyclic carbonate may include, but are not limited to, one or more of the following: ethylene carbonate (EC), propylene carbonate (PC) and butylene carbonate. In some embodiments, the cyclic carbonate has 3-6 carbon atoms.

In some embodiments, examples of the chain carbonate may include, but are not limited to, one or more of the following: dimethyl carbonate, ethyl methyl carbonate, diethyl carbonate (DEC), methyl n-propyl carbonate, ethyl n-propyl carbonate, di-n-propyl carbonate and other chain carbonates. Examples of the fluorine-substituted chain carbonate may include, but are not limited to, one or more of the following: bis(fluoromethyl)carbonate, bis(difluoromethyl)carbonate, bis(trifluoromethyl)carbonate, bis(2-fluoroethyl)carbonate, bis(2,2-difluoroethyl)carbonate, bis(2,2,2-trifluoroethyl)carbonate, 2-fluoroethyl methyl carbonate, 2,2-difluoroethyl methyl carbonate, 2,2,2-trifluoroethyl methyl carbonate and the like.

In some embodiments, examples of the cyclic carboxylate may include, but are not limited to, one or more of the following: one or more of γ-butyrolactone and γ-valerolactone. In some embodiments, a part of hydrogen atoms of the cyclic carboxylate may be substituted with fluorine.

In some embodiments, examples of the chain carboxylate may include, but are not limited to, one or more of the following: methyl acetate, ethyl acetate, propyl acetate, isopropyl acetate, butyl acetate, sec-butyl acetate, isobutyl acetate, tert-butyl acetate, methyl propionate, ethyl propionate, propyl propionate, isopropyl propionate, methyl butyrate, ethyl butyrate, propyl butyrate, methyl isobutyrate, ethyl isobutyrate, methyl valerate, ethyl valerate, methyl pivalate, ethyl pivalate and the like. In some embodiments, a part of hydrogen atoms of the chain carboxylate may be substituted with fluorine. In some embodiments, examples of the fluorine-substituted chain carboxylate may include, but are not limited to, methyl trifluoroacetate, ethyl trifluoroacetate, propyl trifluoroacetate, butyl trifluoroacetate, 2,2,2-trifluoroethyl trifluoroacetate and the like.

In some embodiments, examples of the cyclic ether may include, but are not limited to, one or more of the following: tetrahydrofuran, 2-methyltetrahydrofuran, 1,3-dioxolane, 2-methyl-1,3-dioxolane, 4-methyl-1,3-dioxolane, 1,3-dioxane, 1,4-dioxane and dimethoxypropane.

In some embodiments, examples of the chain ether may include, but are not limited to, one or more of the following:

dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane and the like.

In some embodiments, examples of the phosphorus-containing organic solvent may include, but are not limited to, one or more of the following: trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris(2,2,2-trifluoroethyl) phosphate, tris (2,2,3,3,3-pentafluoropropyl) phosphate and the like.

In some embodiments, examples of the sulfur-containing organic solvent may include, but are not limited to, one or more of the following: sulfolane, 2-methylsulfolane, 3-methylsulfolane, dimethyl sulfone, diethyl sulfone, ethyl methyl sulfone, methyl propyl sulfone, dimethyl sulfoxide, methyl methanesulfonate, ethyl methanesulfonate, methyl ethanesulfonate, ethyl ethanesulfonate, dimethyl sulfate, diethyl sulfate and dibutyl sulfate. In some embodiments, a part of hydrogen atoms of the sulfur-containing organic solvent may be substituted with fluorine.

In some embodiments, the aromatic fluorine-containing solvent includes, but is not limited to, one or more of the following: fluorobenzene, difluorobenzene, trifluorobenzene, tetrafluorobenzene, pentafluorobenzene, hexafluorobenzene and trifluoromethylbenzene.

In some embodiments, the solvent used in the electrolyte of the present application includes a cyclic carbonate, a chain carbonate, a cyclic carboxylate, a chain carboxylate and combinations thereof. In some embodiments, the solvent used in the electrolyte of the present application includes at least one of ethylene carbonate, propylene carbonate, diethyl carbonate, ethyl propionate, propyl propionate, n-propyl acetate or ethyl acetate. In some embodiments, the solvent used in the electrolyte of the present application includes: ethylene carbonate, propylene carbonate, diethyl carbonate, ethyl propionate, propyl propionate, γ-butyrolactone and combinations thereof.

After the chain carboxylate and/or the cyclic carboxylate are added to the electrolyte, the chain carboxylate and/or the cyclic carboxylate may form a passivation film on the surface of the electrode, thereby enhancing the capacity retention rate after the interval charging cycle of the electrochemical device. In some embodiments, the electrolyte contains 1 wt % to 60 wt % of the chain carboxylate, the cyclic carboxylate and a combination thereof. In some embodiments, the electrolyte contains ethyl propionate, propyl propionate, γ-butyrolactone and a combination thereof. Based on the total weight of the electrolyte, a content of the combination is 1 wt % to 60 wt %, 10 wt % to 60 wt %, 10 wt % to 50 wt % or 20 wt % to 50 wt %. In some embodiments, based on the total weight of the electrolyte, the electrolyte contains 1 wt % to 60 wt %, 10 wt % to 60 wt %, 20 wt % to 50 wt %, 20 wt % to 40 wt %, or 30 wt % of propyl propionate.

In some embodiments, examples of the additive may include, but are not limited to, one or more of the following: fluorocarbonate, carbon-carbon double bond-containing ethylene carbonate, sulfur-oxygen double bond-containing compound and acid anhydride.

In some embodiments, based on the total weight of the electrolyte, the content of the additive is 0.01% to 15%, 0.1% to 10% or 1% to 5%.

According to embodiments of the present application, based on the total weight of the electrolyte, the content of the propionate is 1.5 to 30 times, 1.5 to 20 times, 2 to 20 times or 5 to 20 times the additive.

In some embodiments, the additive includes one or more fluorocarbonates. When the lithium-ion battery is charged/discharged, the fluorocarbonate may act together with the propionate to form a stable protective film on the surface of the anode, thereby suppressing the decomposition reaction of the electrolyte.

In some embodiments, the fluorocarbonate has the formula $C=O(OR_1)(OR_2)$, wherein $R_1$ and $R_2$ are each selected from alkyl or haloalkyl having 1-6 carbon atoms, wherein at least one of $R_1$ and $R_2$ is selected from fluoroalkyl having 1-6 carbon atoms, and $R_1$ and $R_2$ optionally form a 5- to 7-membered ring along with the atoms to which they are attached.

In some embodiments, examples of the fluorocarbonate may include, but are not limited to, one or more of the following: fluoroethylene carbonate, cis-4,4-difluoroethylene carbonate, trans-4,4-difluoroethylene carbonate, 4,5-difluoroethylene carbonate, 4-fluoro-4-methylethylene carbonate, 4-fluoro-5-methylethylene carbonate, methyl trifluoromethyl carbonate, methyl trifluoroethyl carbonate, ethyl trifluoroethyl carbonate and the like.

In some embodiments, the additive includes one or more carbon-carbon double bond-containing ethylene carbonates. Examples of the carbon-carbon double bond-containing ethylene carbonate may include, but are not limited to, one or more of the following: vinylene carbonate, methyl vinylene carbonate, ethyl vinylene carbonate, 1,2-dimethylvinylene carbonate, 1,2-diethylvinylene carbonate, fluorovinylene carbonate, trifluoromethyl vinylene carbonate; vinyl ethylene carbonate, 1-methyl-2-vinylethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate, 1,1-diethyl-2-methylene ethylene carbonate and the like. In some embodiments, the carbon-carbon double bond-containing ethylene carbonate includes vinylene carbonate, which is easy to obtain and can achieve more excellent effects.

In some embodiments, the additive includes one or more sulfur-oxygen double bond-containing compounds. Examples of the sulfur-oxygen double bond-containing compound may include, but are not limited to, one or more of the following: a cyclic sulfate, a chain sulfate, a chain sulfonate, a cyclic sulfonate, a chain sulfite, a cyclic sulfite and the like.

Examples of the cyclic sulfate may include, but are not limited to, one or more of the following: 1,2-ethanediol sulfate, 1,2-propanediol sulfate, 1,3-propanediol sulfate, 1,2-butanediol sulfate, 1,3-butanediol sulfate, 1,4-butanediol sulfate, 1,2-pentanediol sulfate, 1,3-pentanediol sulfate, 1,4-pentanediol sulfate, 1,5-pentanediol sulfate and the like.

Examples of the chain sulfate may include, but are not limited to, one or more of the following: dimethyl sulfate, ethyl methyl sulfate, diethyl sulfate and the like.

Examples of the chain sulfonate may include, but are not limited to, one or more of the following: a fluorosulfonate such as methyl fluorosulfonate and ethyl fluorosulfonate, methyl methanesulfonate, ethyl methanesulfonate, butyl dimethanesulfonate, methyl 2-(methylsulfonyloxy)propionate, ethyl 2-(methylsulfonyloxy)propionate and the like.

Examples of the cyclic sulfonate may include, but are not limited to, one or more of the following: 1,3-propane sultone, 1-fluoro-1,3-propane sultone, 2-fluoro-1,3-propane sultone, 3-fluoro-1,3-propane sultone, 1-methyl-1,3-propane sultone, 2-methyl-1,3-propane sultone, 3-methyl-1,3-propane sultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate, ethylene methanedisulfonate and the like.

Examples of the chain sulfite may include, but are not limited to, one or more of the following: dimethyl sulfite, ethyl methyl sulfite, diethyl sulfite and the like.

Examples of the cyclic sulfite may include, but are not limited to, one or more of the following: 1,2-ethanediol sulfite, 1,2-propanediol sulfite, 1,3-propanediol sulfite, 1,2-butanediol sulfite, 1,3-butanediol sulfite, 1,4-butanediol sulfite, 1,2-pentanediol sulfite, 1,3-pentanediol sulfite, 1,4-pentanediol sulfite, 1,5-pentanediol sulfite and the like.

In some embodiments, the additive includes one or more acid anhydrides. Examples of the acid anhydride may include, but are not limited to, one or more of a cyclic phosphoric anhydride, a carboxylic anhydride, a disulfonic anhydride and a carboxylic sulfonic anhydride. Examples of the cyclic phosphoric anhydride may include, but are not limited to, one or more of trimethylphosphoric cyclic anhydride, triethylphosphoric cyclic anhydride and tripropylphosphoric cyclic anhydride. Examples of the carboxylic anhydride may include, but are not limited to, one or more of succinic anhydride, glutaric anhydride and maleic anhydride. Examples of the disulfonic anhydride may include, but are not limited to, one or more of ethane disulfonic anhydride and propane disulfonic anhydride. Examples of the carboxylic sulfonic anhydride may include, but are not limited to, one or more of sulfobenzoic anhydride, sulfopropionic anhydride and sulfobutyric anhydride.

In some embodiments, the additive is a combination of a fluorocarbonate and a carbon-carbon double bond-containing ethylene carbonate. In some embodiments, the additive is a combination of a fluorocarbonate and a sulfur-oxygen double bond-containing compound. In some embodiments, the additive is a combination of a fluorocarbonate and a compound having 2-4 cyano groups. In some embodiments, the additive is a combination of a fluorocarbonate and a cyclic carboxylate. In some embodiments, the additive is a combination of a fluorocarbonate and a cyclic phosphoric anhydride. In some embodiments, the additive is a combination of a fluorocarbonate and a carboxylic anhydride. In some embodiments, the additive is a combination of a fluorocarbonate and a sulfonic anhydride. In some embodiments, the additive is a combination of a fluorocarbonate and a carboxylic sulfonic anhydride.

The electrolyte is not particularly limited, and any well-known material as an electrolyte may be used arbitrarily. In the case of a lithium secondary battery, lithium salts are typically used. Examples of the electrolyte may include, but are not limited to, inorganic lithium salts such as $LiPF_6$, $LiBF_4$, $LiClO_4$, $LiAlF_4$, $LiSbF_6$, $LiTaF_6$, $LiWF_7$ and the like; lithium tungstates such as $LiWOF_5$ and the like; lithium salts of carboxylic acid such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, $CF_3CF_2CF_2CF_2CO_2Li$ and the like; lithium salts of sulfonic acid such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, $CF_3CF_2CF_2CF_2SO_3Li$ and the like; imide lithium salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, cyclic-1,2-perfluoroethane bissulfonimide lithium, cyclic-1,3-perfluoropropane bissulfonimide lithium, $LiN(CF_3SO_2)(C_4F_9SO_2)$ and the like; methylated lithium salts such as $LiC(FSO_2)_3$, $LiC(CF_3SO_2)_3$, $LiC(C_2F_5SO_2)_3$ and the like; lithium (malonate) borates such as lithium bis(malonate)borate, lithium difluoro (malonate)borate and the like; lithium (malonate)phosphates such as lithium tris(malonate)phosphate, lithium difluorobis (malonate)phosphate, lithium tetrafluoro(malonate)phosphate and the like; fluorine-containing organic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, $LiBF_2(C_2F_5SO_2)_2$ and the like; lithium oxalate borates such as lithium difluoro(oxalato)borate, lithium bis(oxalate)borate and the like; and lithium (oxalate)phosphates such as lithium tetrafluoro(oxalate)phosphate, lithium difluorobis(oxalate) phosphate, lithium tris(oxalate)phosphate and the like.

In some embodiments, the electrolyte is selected from $LiPF_6$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, cyclic-1,2-perfluoroethane bissulfonimide lithium, cyclic 1,3-perfluoropropane bissulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$, lithium difluoro(oxalato)borate, lithium bis(oxalate)borate or lithium difluorobis(oxalate)phosphate, which helps to improve output power characteristics, high-rate charge and discharge characteristics, high-temperature storage characteristics, cycle characteristics and the like of the electrochemical device.

The content of the electrolyte is not particularly limited as long as the effect of the present application is not impaired. In some embodiments, the total molar concentration of lithium in the electrolyte is greater than 0.3 mol/L, greater than 0.4 mol/L or greater than 0.5 mol/L. In some embodiments, the total molar concentration of lithium in the electrolyte is less than 3.0 mol/L, less than 2.5 mol/L or less than 2.0 mol/L. In some embodiments, the total molar concentration of lithium in the electrolyte is within a range formed by any two of the above values. When the concentration of the electrolyte is within the above range, lithium as charged particles will not be too small in number, and the viscosity can be in an appropriate range, so it is easy to ensure good conductivity.

In the case where two or more electrolytes are used, the electrolyte includes at least one salt selected from the group consisting of monofluorophosphate, borate, oxalate and fluorosulfonate. In some embodiments, the electrolyte includes a salt selected from the group consisting of monofluorophosphate, oxalate and fluorosulfonate. In some embodiments, the electrolyte includes lithium salts. In some embodiments, based on the total weight of the electrolyte, the content of the salt selected from the group consisting of monofluorophosphate, borate, oxalate and fluorosulfonate is greater than 0.01 wt % or greater than 0.1 wt %. In some embodiments, based on the total weight of the electrolyte, the content of the salt selected from the group consisting of monofluorophosphate, borate, oxalate and fluorosulfonate is less than 20 wt % or less than 10 wt %. In some embodiments, the content of the salt selected from the group consisting of monofluorophosphate, borate, oxalate and fluorosulfonate is within a range formed by any two of the above values.

In some embodiments, the electrolyte includes one or more than one substance selected from the group consisting of monofluorophosphate, borate, oxalate and fluorosulfonate, and one or more than one other salt. Examples of the other salt include the lithium salts exemplified above, in some embodiments, $LiPF_6$, $LiN(FSO_2)(CF_3SO_2)$, $LiN(CF_3SO_2)_2$, $LiN(C_2F_5SO_2)_2$, cyclic-1,2-perfluoroethane bissulfonimide lithium, cyclic-1,3-perfluoropropane bissulfonimide lithium, $LiC(FSO_2)_3$, $LiC(CF_3SO_2)_3$, $LiC(C_2F_5SO_2)_3$, $LiBF_3CF_3$, $LiBF_3C_2F_5$, $LiPF_3(CF_3)_3$, $LiPF_3(C_2F_5)_3$. In some embodiments, the other salt is $LiPF_6$.

In some embodiments, based on the total weight of the electrolyte, the content of the other salt is greater than 0.01 wt % or greater than 0.1 wt %. In some embodiments, based on the total weight of the electrolyte, the content of the other salt is less than 20 wt %, less than 15 wt % or less than 10 wt %. In some embodiments, the content of the other salt is within a range formed by any two of the above values. The other salt having the above content helps to balance the conductivity and viscosity of the electrolyte.

In addition to the above solvent, additive, and electrolyte salt, the electrolyte may contain an anode coating forming agent, a cathode protective agent, an anti-overcharge agent and other additional additives as necessary. As the additive, additives generally used in non-aqueous electrolyte secondary batteries may be used, and examples thereof may include, but are not limited to, vinylene carbonate, succinic anhydride, biphenyl, cyclohexylbenzene, 2,4-difluoroanisole, propane sultone, propene sultone and the like. These additives may be used alone or in any combination. In addition, the content of these additives in the electrolyte is not particularly limited, and may be appropriately set according to the type of the additives and the like. In some embodiments, based on the total weight of the electrolyte, the content of the additive is less than 5 wt %, in the range of 0.01 wt % to 5 wt % or in the range of 0.2 wt % to 5 wt %.

III. Cathode

The cathode includes a cathode current collector and a cathode active material layer disposed on one or two surfaces of the cathode current collector.

1. Cathode Active Material Layer

The cathode active material layer includes a cathode active material, and there may be one or multiple cathode active material layers. Each of the multiple cathode active material layers may include the same or different cathode active materials. The cathode active material is any material that can reversibly intercalate and deintercalate lithium ions and other metal ions.

The type of the cathode active material is not particularly limited as long as it can electrochemically occlude and release metal ions (for example, lithium ions). In some embodiments, the cathode active material is a material containing lithium and at least one transition metal. Examples of the cathode active material may include, but are not limited to, lithium transition metal composite oxides and lithium-containing transition metal phosphate compounds.

In some embodiments, the transition metal in the lithium transition metal composite oxides includes V, Ti, Cr, Mn, Fe, Co, Ni, Cu and the like. In some embodiments, the lithium transition metal composite oxides include lithium cobalt composite oxides such as $LiCoO_2$ and the like, lithium nickel composite oxides such as $LiNiO_2$ and the like, lithium manganese composite oxides such as $LiMnO_2$, $LiMn_2O_4$, $Li_2MnO_4$ and the like, and lithium nickel manganese cobalt composite oxides such as $LiNi_{1/3}Mn_{1/3}Co_{1/3}O_2$, $LiNi_{0.5}Mn_{0.3}Co_{0.2}O_2$ and the like, wherein a part of the transition metal atoms as the main body of these lithium transition metal composite oxides are substituted with Na, K, B, F, Al, Ti, V, Cr, Mn, Fe, Co, Li, Ni, Cu, Zn, Mg, Ga, Zr, Si, Nb, Mo, Sn, W and other elements. Examples of the lithium transition metal composite oxides may include, but are not limited to, $LiNi_{0.5}Mn_{0.5}O_2$, $LiNi_{0.85}Co_{0.10}Al_{0.05}O_2$, $LiNi_{0.33}Co_{0.33}Mn_{0.33}O_2$, $LiNi_{0.45}Co_{0.10}Al_{0.45}O_2$, $LiMn_{1.8}Al_{0.2}O_4$, $LiMn_{1.5}Ni_{0.5}O_4$ and the like. Examples of the combination of the lithium transition metal composite oxides include, but are not limited to, a combination of $LiCoO_2$ and $LiMn_2O_4$, wherein a part of Mn in $LiMn_2O_4$ can be substituted with the transition metal (for example, $LiNi_{0.33}Co_{0.33}Mn_{0.33}O_2$), and a part of Co in $LiCoO_2$ can be substituted with the transition metal.

In some embodiments, the transition metal in the lithium-containing transition metal phosphate compounds includes V, Ti, Cr, Mn, Fe, Co, Ni, Cu and the like. In some embodiments, the lithium-containing transition metal phosphate compounds include iron phosphates such as $LiFePO_4$, $Li_3Fe_2(PO_4)_3$, $LiFeP_2O_7$ and the like, and cobalt phosphates such as $LiCoPO_4$ and the like, wherein a part of the transition metal atoms as the main body of these lithium-containing transition metal phosphate compounds are substituted with Al, Ti, V, Cr, Mn, Fe, Co, Li, Ni, Cu, Zn, Mg, Ga, Zr, Nb, Si and other elements.

In some embodiments, the cathode active material includes lithium phosphate, which may improve the continuous charging characteristics of the electrochemical device. The use of the lithium phosphate is not limited. In some embodiments, the cathode active material and the lithium phosphate are used in combination. In some embodiments, relative to the total weight of the cathode active material and the lithium phosphate, the content of the lithium phosphate is greater than 0.1 wt %, greater than 0.3 wt % or greater than 0.5 wt %. In some embodiments, relative to the total weight of the cathode active material and the lithium phosphate, the content of the lithium phosphate is less than 10 wt %, less than 8 wt % or less than 5 wt %. In some embodiments, the content of the lithium phosphate is within a range formed by any two of the above values.

Surface Coating

The surface of the above cathode active material may have a material different from its composition attached. Examples of the surface-attached material may include, but are not limited to, aluminum oxide, silicon dioxide, titanium dioxide, zirconium dioxide, magnesium oxide, calcium oxide, boron oxide, antimony oxide, bismuth oxide and other oxides, lithium sulfate, sodium sulfate, potassium sulfate, magnesium sulfate, calcium sulfate, aluminum sulfate and other sulfates, lithium carbonate, calcium carbonate, magnesium carbonate and other carbonates, carbon, and the like.

These surface-attached materials may be attached to the surface of the cathode active material by the following methods: a method of dissolving or suspending the surface-attached material in a solvent so that it is infiltrated and added to the cathode active material and performing drying; a method of dissolving or suspending a surface-attached material precursor in a solvent, and after infiltrating and adding the precursor to the cathode active material, performing a reaction by heating and the like; and a method of adding to a cathode active material precursor and performing firing at the same time, and the like. In the case where carbon is attached, a method of mechanically attaching a carbon material (for example, activated carbon and the like) may also be used.

In some embodiments, based on the total weight of the cathode active material layer, the content of the surface-attached material is greater than 0.1 ppm, greater than 1 ppm or greater than 10 ppm. In some embodiments, based on the total weight of the cathode active material layer, the content of the surface-attached material is less than 20%, less than 10% or less than 10%. In some embodiments, based on the total weight of the cathode active material layer, the content of the surface-attached material is within a range formed by any two of the above values.

By attaching the material to the surface of the cathode active material, the oxidation reaction of the electrolyte on the surface of the cathode active material can be suppressed, and the service life of the electrochemical device can be prolonged. When the amount of the surface-attached material is too small, its effect cannot be fully exhibited. When the amount of the surface-attached material is too large, it will hinder the entry and exit of lithium ions, so the resistance may sometimes increase.

In the present application, a cathode active material having a material different from its composition attached to the surface of the cathode active material is also referred to as a "cathode active material".

Shape

In some embodiments, the shape of cathode active material particles includes, but is not limited to, massive, polyhedral, spherical, ellipsoidal, plate-shaped, needle-shaped, columnar and the like. In some embodiments, the cathode active material particles include primary particles, secondary particles or a combination thereof. In some embodiments, the primary particles can aggregate to form the secondary particles.

Tap Density

In some embodiments, the tap density of the cathode active material is greater than 0.5 $g/cm^3$, greater than 0.8 $g/cm^3$ or greater than 1.0 $g/cm^3$. When the tap density of the cathode active material is within the above range, the amount of a dispersion medium required for the formation of the cathode active material layer and the required amounts of the conductive material and the cathode binder can be suppressed, thereby ensuring the packing rate of the cathode active material and the capacity of the electrochemical device. By using a composite oxide powder with a high tap density, a high-density cathode active material layer can be formed. Typically, the larger the tap density, the more preferable, and there is no particular upper limit. In some embodiments, the tap density of the cathode active material is less than 4.0 $g/cm^3$, less than 3.7 $g/cm^3$ or less than 3.5 $g/cm^3$. When the tap density of the cathode active material has the upper limit as described above, a decrease in load characteristics can be suppressed.

The tap density of the cathode active material may be calculated by the following method: 5 g to 10 g of cathode active material powder is put into a 10 mL glass measuring cylinder, 200 vibrations with a stroke of 20 mm are performed, and the packing density (tap density) of the powder is obtained.

Median Particle Size (D50)

When the cathode active material particles are primary particles, the median particle size (D50) of the cathode active material particles refers to a primary particle size of the cathode active material particles. When the primary particles of the cathode active material particles aggregate to form secondary particles, the median particle size (D50) of the cathode active material particles refers to a secondary particle size of the cathode active material particles.

In some embodiments, the median particle size (D50) of the cathode active material particles is greater than 0.3 μm, greater than 0.5 μm, greater than 0.8 μm or greater than 1.0 μm. In some embodiments, the median particle size (D50) of the cathode active material particles is less than 30 μm, less than 27 μm, less than 25 μm or less than 22 μm. In some embodiments, the median particle size (D50) of the cathode active material particles is within a range formed by any two of the above values. When the median particle size (D50) of the cathode active material particles is within the above range, a cathode active material with a high tap density can be obtained, and a decrease in performance of the electrochemical device can be suppressed. On the other hand, during the preparation of the cathode of the electrochemical device (that is, when the cathode active material, the conductive material, the binder and the like are slurried with a solvent and are used for coating in a film form), problems such as production of stripes can be prevented. Here, by mixing two or more than two types of cathode active materials having different median particle sizes, the packing properties of the cathode during the preparation can be further enhanced.

The median particle size (D50) of the cathode active material particles may be measured by using a laser diffraction/scattering particle size distribution measuring device: in the case of using LA-920 manufactured by HORIBA Ltd. as a particle size distribution meter, a 0.1 wt % sodium hexametaphosphate aqueous solution is used as a dispersion medium for measurement, and after 5 minutes of ultrasonic dispersion, a measurement is performed by setting the measured refractive index as 1.24.

Average Primary Particle Size

In the case where the primary particles of the cathode active material particles aggregate to form secondary particles, in some embodiments, the average primary particle size of the cathode active material is greater than 0.05 μm, greater than 0.1 μm or greater than 0.5 μm. In some embodiments, the average primary particle size of the cathode active material is less than 5 μm, less than 4 μm, less than 3 μm or less than 2 μm. In some embodiments, the average primary particle size of the cathode active material is within a range formed by any two of the above values. When the average primary particle size of the cathode active material is within the above range, the packing properties and specific surface area of the powder can be ensured, a decrease in battery performance can be suppressed, and moderate crystallinity can be obtained, thereby ensuring the charge and discharge reversibility of the electrochemical device.

The average primary particle size of the cathode active material may be obtained by observing an image obtained by a scanning electron microscope (SEM): in the SEM image with a magnification of 10,000 times, for any 50 primary particles, the longest value of the slice obtained from the left and right boundary lines of the primary particles relative to the horizontal straight line is obtained, and the average is calculated, thereby obtaining the average primary particle size.

Specific Surface Area (BET)

In some embodiments, the specific surface area (BET) of the cathode active material is greater than 0.1 $m^2/g$, greater than 0.2 $m^2/g$ or greater than 0.3 $m^2/g$. In some embodiments, the specific surface area (BET) of the cathode active material is less than 50 $m^2/g$, less than 40 $m^2/g$ or less than 30 $m^2/g$. In some embodiments, the specific surface area (BET) of the cathode active material is within a range formed by any two of the above values. When the specific surface area (BET) of the cathode active material is within the above range, the performance of the electrochemical device can be ensured, and at the same time, the cathode active material can have good coatability.

The specific surface area (BET) of the cathode active material may be measured by the following method: an OKURA RIKEN surface area meter (for example, a full automatic surface area measuring device manufactured by OKURA RIKEN) is used, the sample is pre-dried at 150° C. for 30 minutes under nitrogen flow, and then a nitrogen-helium mixed gas of which the relative pressure value of nitrogen relative to atmospheric pressure is accurately adjusted to 0.3 is used for measurement by a nitrogen adsorption BET single-point method using a gas flow method.

Cathode Conductive Material

The type of the cathode conductive material is not limited, and any known conductive material may be used. Examples of the cathode conductive material may include: graphite such as natural graphite, artificial graphite and the like; carbon black such as acetylene black and the like; carbon materials such as needle coke, amorphous carbon and the like; carbon nanotubes; and graphene and the like. The above cathode conductive materials may be used alone or in any combination.

In some embodiments, based on the total weight of the cathode active material layer, the content of the cathode conductive material is greater than 0.01 wt %, greater than 0.1 wt % or greater than 1 wt %. In some embodiments, based on the total weight of the cathode active material layer, the content of the cathode conductive material is less than 50 wt %, less than 30 wt % or less or less than 15 wt %. When the content of the cathode conductive material is within the above range, sufficient conductivity and capacity of the electrochemical device can be ensured.

Cathode Binder

The type of the cathode binder used in the manufacture of the cathode active material layer is not particularly limited, as long as it is a material that can be dissolved or dispersed in a liquid medium used in the manufacture of the electrode in the case of a coating method. Examples of the cathode binder may include, but are not limited to, one or more of the following: resin polymers such as polyethylene, polypropylene, polyethylene terephthalate, polymethyl methacrylate, polyimide, aromatic polyamide, cellulose, nitrocellulose and the like; rubber-like polymers such as styrene-butadiene rubber (SBR), nitrile-butadiene rubber (NBR), fluororubber, isoprene rubber, butadiene rubber, ethylene-propylene rubber and the like; thermoplastic elastomer-like polymers such as styrene-butadiene-styrene block copolymer or hydrides thereof, ethylene-propylene-diene terpolymer (EPDM), styrene-ethylene-butadiene-ethylene copolymer, styrene-isoprene-styrene block copolymer or hydrides thereof, and the like; soft resin-like polymers such as syndiotactic-1,2-polybutadiene, polyvinyl acetate, ethylene-vinyl acetate copolymer, propylene-α-olefin copolymer and the like; fluorine polymers such as polyvinylidene fluoride (PVDF), polytetrafluoroethylene, fluorinated polyvinylidene fluoride, polytetrafluoroethylene-ethylene copolymer and the like; and polymer compositions having ion conductivity of alkali metal ions (particularly lithium ions), and the like. The above cathode binders may be used alone or in any combination.

In some embodiments, based on the total weight of the cathode active material layer, the content of the cathode binder is greater than 0.1 wt %, greater than 1 wt % or greater than 1.5 wt %. In some embodiments, based on the total weight of the cathode active material layer, the content of the cathode binder is less than 80 wt %, less than 60 wt %, less than 40 wt % or less than 10 wt %. When the content of the cathode binder is within the above range, the cathode can have good conductivity and sufficient mechanical strength, and the capacity of the electrochemical device can be ensured.

Solvent

The type of the solvent for forming a cathode slurry is not limited as long as it is a solvent that can dissolve or disperse the cathode active material, the conductive material, the cathode binder and the thickener used as necessary. Examples of the solvent for forming the cathode slurry may include any one of an aqueous solvent and an organic solvent. Examples of the aqueous medium may include, but are not limited to, water and a mixed medium of alcohol and water, and the like. Examples of the organic medium may include, but are not limited to, aliphatic hydrocarbons such as hexane and the like; aromatic hydrocarbons such as benzene, toluene, xylene, methylnaphthalene and the like; heterocyclic compounds such as quinoline, pyridine and the like; ketones such as acetone, methyl ethyl ketone, cyclohexanone and the like; esters such as methyl acetate, methyl acrylate and the like; amines such as diethylenetriamine, N,N-dimethylaminopropylamine and the like; ethers such as diethyl ether, propylene oxide, tetrahydrofuran (THF) and the like; amides such as N-methylpyrrolidone (NMP), dimethylformamide, dimethylacetamide and the like; and aprotic polar solvents such as hexamethylphosphoramide, dimethyl sulfoxide and the like.

Thickener

A thickener is typically used to adjust the viscosity of a slurry. In the case of using an aqueous medium, a thickener and a styrene-butadiene rubber (SBR) latex may be used to perform slurrying. The type of the thickener is not particularly limited, and examples thereof may include, but are not limited to, carboxymethyl cellulose, methyl cellulose, hydroxymethyl cellulose, ethyl cellulose, polyvinyl alcohol, oxidized starch, phosphated starch, casein and salts thereof, and the like. The above thickeners may be used alone or in any combination.

In some embodiments, based on the total weight of the cathode active material layer, the content of the thickener is greater than 0.1 wt %, greater than 0.2 wt % or greater than 0.3 wt %. In some embodiments, based on the total weight of the cathode active material layer, the content of the thickener is less than 5 wt %, less than 3 wt % or less than 2 wt %. In some embodiments, based on the total weight of the cathode active material layer, the content of the thickener is within a range formed by any two of the above values. When the content of the thickener is within the above range, the cathode slurry can have good coatability, and at the same time, a decrease in the capacity of the electrochemical device and an increase in the resistance can be suppressed.

Content of Cathode Active Material

In some embodiments, based on the total weight of the cathode active material layer, the content of the cathode active material is greater than 80 wt %, greater than 82 wt % or greater than 84 wt %. In some embodiments, based on the total weight of the cathode active material layer, the content of the cathode active material is less than 99 wt % or less than 98 wt %. In some embodiments, based on the total weight of the cathode active material layer, the content of the cathode active material is within a range formed by any two of the above values. When the content of the cathode active material is within the above range, the capacitance of the cathode active material in the cathode active material layer can be ensured, and at the same time, the strength of the cathode can be maintained.

Density of Cathode Active Material

For the cathode active material layer obtained by coating and drying, in order to enhance the packing density of the cathode active material, a compaction treatment may be performed by a manual press, a roll press or the like. In some embodiments, the density of the cathode active material layer is greater than 1.5 g/cm$^3$, greater than 2 g/cm$^3$ or greater than 2.2 g/cm$^3$. In some embodiments, the density of the cathode active material layer is less than 5 g/cm$^3$, less than 4.5 g/cm$^3$ or less than 4 g/cm$^3$. In some embodiments, the density of the cathode active material layer is within a range formed by any two of the above values. When the density of the cathode active material layer is within the above range, the electrochemical device can have good charge and discharge characteristics, and at the same time, an increase in the resistance can be suppressed.

Thickness of Cathode Active Material Layer

The thickness of the cathode active material layer refers to a thickness of the cathode active material layer on any side of a cathode current collector. In some embodiments, the thickness of the cathode active material layer is greater than 10 μm or greater than 20 μm. In some embodiments, the thickness of the cathode active material layer is less than 500 μm or less than 450 μm.

Manufacturing Method of Cathode Active Material

The cathode active material may be manufactured by using a common method for manufacturing inorganic compounds. In order to manufacture a spherical or ellipsoidal cathode active material, the following manufacturing method may be used: a raw material of the transition metal is dissolved or pulverized and dispersed in a solvent such as water or the like, the mixture is stirred while the pH is adjusted, a precursor of spheres is manufactured and recovered, and dried as necessary, a Li source such as LiOH, Li$_2$CO$_3$, LiNO$_3$ or the like is added, and firing is performed at a high temperature to obtain the cathode active material.

2. Cathode Current Collector

The type of the cathode current collector is not particularly limited, and it may be any known material suitable for use as a cathode current collector. Examples of the cathode current collector may include, but are not limited to, aluminum, stainless steel, a nickel plating, titanium, tantalum and other metal materials; and carbon cloth, carbon paper and other carbon materials. In some embodiments, the cathode current collector is a metal material. In some embodiments, the cathode current collector is aluminum.

The form of the cathode current collector is not particularly limited. When the cathode current collector is a metal material, the form of the cathode current collector may include, but is not limited to, metal foil, a metal cylinder, a metal tape coil, a metal plate, a metal film, expanded metal, stamped metal, foam metal and the like. When the cathode current collector is the carbon material, the form of the cathode current collector may include, but is not limited to, a carbon plate, a carbon film, a carbon cylinder and the like. In some embodiments, the cathode current collector is a metal film. In some embodiments, the metal film is meshy. The thickness of the metal film is not particularly limited. In some embodiments, the thickness of the metal film is greater than 1 μm, greater than 3 μm or greater than 5 μm. In some embodiments, the thickness of the metal film is less than 1 mm, less than 100 μm or less than 50 μm. In some embodiments, a thickness of the metal film is within a range formed by any two of the above values.

In order to reduce the electronic contact resistance of the cathode current collector and the cathode active material layer, the surface of the cathode current collector may include a conductive auxiliary agent. Examples of the conductive auxiliary agent may include, but are not limited to, carbon and precious metals such as gold, platinum, silver and the like.

The thickness ratio of the cathode current collector to the cathode active material layer refers to a ratio of the thickness of the single-sided cathode active material layer to the thickness of the cathode current collector before the injection of the electrolyte, and the value is not particularly limited. In some embodiments, the thickness ratio of the cathode current collector to the cathode active material layer is less than 20, less than 15 or less than 10. In some embodiments, the thickness ratio of the cathode current collector to the cathode active material layer is greater than 0.5, greater than 0.8 or greater than 1. In some embodiments, the thickness ratio of the cathode current collector to the cathode active material layer is within a range formed by any two of the above values. When the thickness ratio of the cathode current collector to the cathode active material layer is within the above range, the heat release of the cathode current collector during high-current-density charge and discharge can be suppressed, and the capacity of the electrochemical device can be ensured.

3. Composition and Manufacturing Method of Cathode

The cathode may be manufactured by forming a cathode active material layer containing a cathode active material and a viscous active material on a current collector. The manufacture of the cathode using the cathode active material may be performed by a conventional method, that is, the cathode active material and the viscous active material as well as a conductive material, a thickener and the like as necessary are subjected to dry mixing to obtain a plate, and the obtained plate is pressed onto a cathode current collector; or these materials are dissolved or dispersed in a liquid medium to obtain a slurry, and the slurry is applied to a cathode current collector and dried to form a cathode active material layer on the current collector, thereby obtaining the cathode.

IV. Separator

In order to prevent short circuits, a separator is typically disposed between the cathode and the anode. In this case, the electrolyte of the present application is typically used by infiltrating the separator.

The material and shape of the separator are not particularly limited as long as the effect of the present application is not significantly impaired. The separator may be a resin, a glass fiber, an inorganic substance or the like formed by a material that is stable with the electrolyte of the present application. In some embodiments, the separator includes a material with excellent liquid retention properties in the form of a porous sheet or a non-woven fabric. Examples of the material of the resin or glass fiber separator may include, but are not limited to, polyolefin, aromatic polyamide, polytetrafluoroethylene, polyethersulfone, a glass filter and the like. In some embodiments, the material of the separator is a glass filter. In some embodiments, the polyolefin is polyethylene or polypropylene. In some embodiments, the polyolefin is polypropylene. The above materials of the separator may be used alone or in any combination.

The separator may also be a material laminated with the above materials, and examples thereof include, but are not limited to, a three-layer separator laminated in an order of polypropylene, polyethylene, and polypropylene, and the like.

Examples of the material of the inorganic substance may include, but are not limited to, oxides such as aluminum oxide, silicon dioxide and the like, nitrides such as aluminum nitride, silicon nitride and the like, and sulfates (for example, barium sulfate, calcium sulfate and the like). The form of the inorganic substance may include, but are not limited to, granular or fibrous.

The form of the separator may be a film form, and examples thereof include, but are not limited to, a non-woven fabric, a woven fabric, a microporous membrane and the like. In the film form, the separator has a pore size of 0.01 µm to 1 µm and a thickness of 5 µm to 50 µm. In addition to the above independent film-like separator, the following separator may be used: a separator formed by forming a composite porous layer containing the above inorganic substance particles on the surface of the cathode and/or anode by using a resin binder, for example, a separator formed by forming porous layers on two surfaces of the cathode from aluminum oxide particles with a 90% particle size of less than 1 µm by using a fluororesin as a binder.

The thickness of the separator is arbitrary. In some embodiments, the thickness of the separator is greater than 1 µm, greater than 5 µm or greater than 8 µm. In some embodiments, the thickness of the separator is less than 50 µm, less than 40 µm or less than 30 µm. In some embodiments, the thickness of the separator is within a range formed by any two of the above values. When the thickness of the separator is within the above range, insulativity and mechanical strength can be ensured, and rate characteristics and energy density of the electrochemical device can be ensured.

When a porous material in the form of a porous sheet or a non-woven fabric or the like is used as the separator, the porosity of the separator is arbitrary. In some embodiments, the porosity of the separator is greater than 20%, greater than 35% or greater than 45%. In some embodiments, the porosity of the separator is less than 90%, less than 85% or less than 75%. In some embodiments, the porosity of the separator is within a range formed by any two of the above values. When the porosity of the separator is within the above range, insulativity and mechanical strength can be ensured, and membrane resistance can be suppressed, so that the electrochemical device has good rate characteristics.

The average pore size of the separator is also arbitrary. In some embodiments, the average pore size of the separator is less than 0.5 µm or less than 0.2 µm. In some embodiments, the average pore size of the separator is greater than 0.05 µm. In some embodiments, the average pore size of the separator is within a range formed by any two of the above values. If the average pore size of the separator exceeds the above range, a short circuit may easily occur. When the average pore size of the separator is within the above range, the membrane resistance can be suppressed while the short circuit is prevented, so that the electrochemical device has good rate characteristics.

V. Electrochemical Device Module

The electrochemical device module includes an electrode assembly, a current collecting structure, an outer shell and a protective element.

Electrode Assembly

The electrode assembly may be any one of a laminated structure laminated from the cathode and the anode described above separated by the above separator, and a structure spirally wound from the cathode and the anode described above separated by the above separator. In some embodiments, the proportion of the mass of the electrode assembly in the internal volume of the battery (electrode assembly occupancy) is greater than 40% or greater than 50%. In some embodiments, the electrode assembly occupancy is less than 90% or less than 80%. In some embodiments, the electrode assembly occupancy is within a range formed by any two of the above values. When the electrode assembly occupancy is within the above range, the capacity of the electrochemical device can be ensured, and at the same time, a decrease in characteristics such as repeated charge and discharge performance and high-temperature storage performance accompanying the increase in internal pressure can be suppressed, thereby preventing a gas release valve from operation.

Current Collecting Structure

The current collecting structure is not particularly limited. In some embodiments, the current collecting structure is a structure that reduces the resistance of a wiring portion and a bonding portion. When the electrode assembly is the above laminated structure, it is suitable to use a structure formed by bundling the metal core portion of each electrode layer and welding the bundle to a terminal. When the area of the electrode increases, the internal resistance increases, so it is also suitable to dispose 2 or more than 2 terminals in the electrode to reduce the resistance. When the electrode assembly is the above wound structure, by disposing 2 or more than 2 lead structures respectively on each of the cathode and the anode and bundling them on the terminals, the internal resistance can be reduced.

Outer Shell

The material of the outer shell is not particularly limited, as long as it is stable with the electrolyte used. The outer shell can may be, but is not limited to, a nickel-plated steel plate, stainless steel, aluminum or aluminum alloy, magnesium alloy and other metals, or a laminated film of resin and aluminum foil. In some embodiments, the outer shell is a metal or laminated film of aluminum or aluminum alloy.

The metal outer shell includes, but is not limited to, a package sealed structure formed by fusing metals to each other by laser welding, resistance welding or ultrasonic welding; or a riveted structure formed by using the above metals separated by a resin gasket. The outer shell using the above laminated film includes, but is not limited to, a package sealed structure formed by thermally bonding resin layers to each other, and the like. In order to enhance the sealability, a resin different from the resin used in the laminated film may be sandwiched between the above resin layers. When the resin layers are thermally bonded through a current collecting terminal to form a sealed structure, a resin having a polar group or a modified resin having a polar group introduced may be used as the sandwiched resin due to the bonding of the metal and the resin. In addition, the shape of the outer shell is also arbitrary, and may be, for example, any one of a cylindrical shape, a square shape, a laminated type, a button type, a large type and the like.

Protective Element

The protective element may be a positive temperature coefficient (PTC), a temperature fuse or a thermistor whose resistance increases when abnormal heat is released or excessive current flows, a valve (current cut-off valve) that cuts off the current flowing in the circuit by rapidly increasing the internal pressure or the internal temperature of the battery when abnormal heat is released, or the like. The above protective element may be an element that does not operate during normal use at a high current, and may also be designed in such a manner that abnormal heat release or thermal runaway may not occur even if there is no protective element.

VI. Application

The electrochemical device of the present application includes any device where an electrochemical reaction occurs, and its specific examples include all types of primary batteries, secondary batteries, fuel cells, solar cells or capacitors. In particular, the electrochemical device is a lithium secondary battery, including a lithium metal secondary battery, a lithium-ion secondary battery, a lithium polymer secondary battery or a lithium ion polymer secondary battery.

The present application further provides an electronic device, including the electrochemical device according to the present application.

The use of the electrochemical device of the present application is not particularly limited and it may be used in any electronic device known in the prior art. In some embodiments, the electrochemical device of the present application may be used in, but not limited to, a notebook computer, a pen input computer, a mobile computer, an e-book player, a portable phone, a portable fax machine, a portable copying machine, a portable printer, stereo headphones, a video recorder, a liquid crystal display television, a portable cleaner, a portable CD player, a minidisc player, a transceiver, an electronic notebook, a calculator, a memory card, a portable recorder, a radio, a backup power supply, a motor, a car, a motorcycle, an electric bicycle, a bicycle, a lighting fixture, a toy, a game console, a clock, an electric tool, a flash light, a camera, a large household storage battery, a lithium-ion capacitor and the like.

Hereinafter, the preparation of the lithium-ion battery is described by taking the lithium-ion battery as an example and in conjunction with specific embodiments. Those skilled in the art will understand that the preparation methods described in the present application are only examples, and any other suitable preparation methods are within the scope of the present application.

EXAMPLES

The performance evaluation of the examples of the lithium-ion battery according to the present application and comparative examples will be described below.

I. Preparation of Lithium-Ion Battery

1. Preparation of Anode

Artificial graphite, styrene-butadiene rubber and carboxymethylcellulose sodium were mixed according to a mass ratio of 96%:2%:2% with deionized water and an auxiliary agent, and the mixture was stirred uniformly to obtain an anode slurry. 12 μm copper foil was coated with the anode slurry, dried, cold-pressed, and then subjected to slice cutting and tab welding to obtain an anode. The anode was disposed according to the conditions of the following examples and comparative examples such that it had corresponding parameters.

2. Preparation of Cathode

Lithium cobalt oxide ($LiCoO_2$), a conductive material (Super-P) and polyvinylidene fluoride (PVDF) were mixed according to a mass ratio of 95%:2%:3% with N-methylpyrrolidone (NMP), and stirred uniformly to obtain a cathode slurry. 12 μm aluminum foil was coated with the cathode slurry, dried, cold-pressed, and then subjected to slice cutting and tab welding to obtain a cathode.

3. Preparation of Electrolyte

Under a dry argon atmosphere, EC, PC and DEC (weight ratio 1:1:1) were mixed, and $LiPF_6$ was added and mixed uniformly to form a basic electrolyte, wherein the concentration of $LiPF_6$ was 1.15 mol/L. Different amounts of additive were added to the basic electrolyte to obtain electrolytes of different examples and comparative examples.

4. Preparation of Separator

A polyethylene (PE) porous polymer film was used as a separator.

5. Preparation of Lithium-Ion Battery

The obtained cathode, separator and anode were wound in order, and placed in outer packaging foil, leaving a liquid injection port. The lithium-ion battery was obtained by injecting the electrolyte from the liquid injection port, performing encapsulation, and then performing processes such as formation and capacity.

II. Test Methods

1. Test Method for Contact Angle of Anode Active Material Layer Relative to Non-Aqueous Solvent 3 microliters of diethyl carbonate were dropwise added to the surface of the anode active material layer, test was performed by using a JC2000D3E contact angle measuring instrument within 100 seconds, and a 5-point fitting method (that is, 2 points on the left and right planes of the droplet were taken first to determine a liquid-solid interface, and then 3 points were taken on the arc of the droplet) was used for fitting to obtain the contact angle of the anode active material layer relative to the non-aqueous solvent. Each sample was measured at least 3 times, and at least 3 data samples with a difference of less than 5° were selected and averaged to obtain the contact angle of the anode active material layer relative to the non-aqueous solvent.

2. Test Method for Droplet Diameter of Non-Aqueous Solvent 3 microliters of diethyl carbonate were dropwise added to the surface of the anode active material layer, the droplet diameter was tested by using a JC2000D3E contact angle measuring instrument within 100 seconds.

3. Test Method for Porosity of Anode Active Material Layer

A AccuPyc II 1340 true density tester was used for testing, each sample was measured at least 3 times, and at least 3 data samples were selected and averaged. The porosity of the anode active material layer was calculated according to the following formula:

$$Porosity=(V1-V2)/V1\times100\%$$

wherein V1 was the apparent volume, V1=sample surface area×sample thickness×number of samples; V2 was the true volume.

4. Test Method for Specific Surface Area (BET)

An Okura Riken surface area meter (a full automatic surface area measuring device manufactured by OKURA RIKEN) was used, the sample was pre-dried at 350° C. for 15 minutes under nitrogen flow, and then a nitrogen-helium mixed gas of which the relative pressure value of nitrogen relative to atmospheric pressure was accurately adjusted to 0.3 was used for measurement by a nitrogen adsorption BET single-point method using a gas flow method.

5. Test Method for Median Particle Size (D50)

The carbon material was dispersed in a 0.2 wt % aqueous solution (10 mL) of polyoxyethylene (20) sorbitan monolaurate, and a HORIBA LA-700 laser diffraction/scattering particle size distribution meter was used for testing.

6. Test Method for Surface Tension of Auxiliary Agent

A JC2000D3E contact angle measuring instrument was used to test an auxiliary agent aqueous solution with a solid content of 1%, each sample was tested at least 3 times, and at least 3 data samples were selected and averaged to obtain the surface tension of the auxiliary agent.

7. Test Method for Reaction Area of Anode Active Material Layer

The specific surface area of the anode active material layer was tested according to the above "test method for specific surface area (BET)". The specific surface area of the anode active material layer refers to a specific surface area of the entire anode active material layer containing the anode active material and additives (binder, conductive agent, thickener, filler and the like). The weight of the anode active material layer, that is, the total weight of the entire anode active material layer containing the anode active material and additives (binder, conductive agent, thickener, filler and the like), was measured. The reaction area of the anode active material layer was calculated by the following formula:

Reaction area=specific surface area of anode active material layer×weight of anode active material layer.

8. Test Method for Capacity Retention Rate after Cycle of Lithium-Ion Battery

At 45° C., the lithium-ion battery was charged at a constant current of 1 C to 4.45 V, then charged at a constant voltage of 4.45 V to a current of 0.05 C, and discharged at a constant current of 1 C to 3.0 V, which was the first cycle. The lithium-ion battery was subjected to 200 cycles under the above conditions. "1 C" refers to a current value at which the lithium-ion battery capacity was completely discharged within 1 hour.

The capacity retention rate after cycle of the lithium-ion battery was calculated by the following formula:

Capacity retention rate after cycle=(discharge capacity of corresponding number of cycles/discharge capacity of first cycle)×100%.

9. Test Method for Cycle Swelling Rate of Lithium-Ion Battery

At 25° C., the lithium-ion battery was allowed to stand for 30 minutes, then charged at a constant current of 0.5 C to 4.45 V, charged at a constant voltage of 4.45 V to 0.05 C, and allowed to stand for 5 minutes, and the thickness was measured. A cycle test was then performed, and the thickness of the battery after 100 cycles was measured. The 100-cycle thickness swelling rate of the lithium-ion battery was calculated by the following formula:

Cycle thickness swelling rate=[(thickness after cycle−thickness before cycle)/thickness before cycle]×100%.

III. Test Results

Table 1 shows the contact angle of the anode active material layer relative to the non-aqueous solvent, the porosity, the auxiliary agent used and the cycle performance of the lithium-ion battery in the examples and comparative example. Auxiliary agent 1 was used in the examples: 1000 ppm of trisiloxane surfactant (CAS No. 3390-61-2; 28855-11-0).

TABLE 1

|  | Contact Angle | Porosity | Capacity Retention Rate After Cycle | Cycle Thickness Swelling Rate |
| --- | --- | --- | --- | --- |
| Comparative Example 1 | 70° | 5% | 51% | 41% |
| Example 1 | 60° | 5% | 60% | 32% |
| Example 2 | 40° | 5% | 65% | 23% |
| Example 3 | 35° | 65% | 75% | 18% |
| Example 4 | 35° | 20% | 82% | 15% |

TABLE 1-continued

|  | Contact Angle | Porosity | Capacity Retention Rate After Cycle | Cycle Thickness Swelling Rate |
| --- | --- | --- | --- | --- |
| Example 5 | 22° | 30% | 80% | 14% |
| Example 6 | 20° | 20% | 84% | 12% |
| Example 7 | 25° | 60% | 78% | 16% |
| Example 8 | 5° | 50% | 81% | 13% |

The results show that when the contact angle of the anode active material layer relative to the non-aqueous solvent is not greater than 60°, the capacity retention rate after cycle and the cycle thickness swelling rate of the lithium-ion battery are significantly enhanced. On the basis that the contact angle of the anode active material layer relative to the non-aqueous solvent is not greater than 60°, making the anode active material layer have a porosity of 10% to 60% can further improve the capacity retention rate after cycle and the cycle thickness swelling rate of the lithium-ion battery.

Table 2 shows the effects of the specific surface area (BET) and median particle size (D50) of the carbon material on the cycle performance of the lithium-ion battery. The examples in Table 2 are improvements based on Example 4, with the only difference in the parameters listed in Table 2.

TABLE 2

|  | BET ($m^2/g$) | D50 (μm) | Capacity Retention Rate After Cycle | Cycle Thickness Swelling Rate |
| --- | --- | --- | --- | --- |
| Example 4 | 20 | 35 | 82% | 15% |
| Example 9 | 3 | 20 | 83% | 14% |
| Example 10 | 2 | 20 | 84% | 13% |
| Example 11 | 2 | 15 | 85% | 12.5% |
| Example 12 | 2 | 10 | 86% | 12% |
| Example 13 | 2 | 5 | 85% | 11% |
| Example 14 | 2 | 30 | 83% | 13.8% |

The results show that when the specific surface area (BET) of the carbon material is less than 5 $m^2/g$ and/or the median particle size (D50) is within the range of 5 μm to 30 μm, the capacity retention rate after cycle and the cycle thickness swelling rate of the lithium-ion battery are further improved.

Table 3 shows the effects of trace metals in the anode active material layer on the cycle performance of the lithium-ion battery. The examples in Table 3 are improvements based on Example 4, with the only difference in the parameters listed in Table 3.

TABLE 3

|  | Metal | Content (wt %) | Capacity Retention Rate After Cycle | Cycle Thickness Swelling Rate |
| --- | --- | --- | --- | --- |
| Example 4 | / | / | 82% | 15% |
| Example 15 | Fe | 0.002 | 83% | 14.5% |
| Example 16 | Cu | 0.002 | 82.5% | 14.2% |
| Example 17 | Mo Fe | 0.004 0.004 | 84% | 13.2% |
| Example 18 | Mo Cu | 0.004 0.001 | 83.5% | 13.8% |
| Example 19 | Fe Cu | 0.0005 0.0005 | 83.8% | 14.1% |
| Example 20 | Fe Cu | 0.03 0.02 | 82.5% | 14.5% |

The results show that when a trace metal element (for example, iron, molybdenum or copper) is present in the anode active material layer, the capacity retention rate after cycle and the cycle thickness swelling rate of the lithium-ion battery can be further improved.

Table 4 shows the effects of the aids on the cycle performance of the lithium-ion battery. The difference between Examples 21 to 25 and Example 4 in Table 4 is only in the type of the auxiliary agent.

TABLE 4

| | Auxiliary agent (1000 ppm) | Oxidation Potential (V) | Reduction Potential (V) | Surface Tension (mN/m) | Capacity Retention Rate After Cycle | Cycle Thickness Swelling Rate |
|---|---|---|---|---|---|---|
| Comparative Example 1 | / | / | / | / | 51% | 41% |
| Example 4 | Auxiliary agent 1 | 4.5 | 0.5 | 30 | 82% | 15% |
| Example 21 | Polyether siloxane | 4.8 | 0.3 | 15 | 86% | 12% |
| Example 22 | Peregal | 4.6 | 0.2 | 20 | 85% | 13% |
| Example 23 | Polyether | 4.7 | 0.1 | 30 | 86% | 10% |
| Example 24 | Ethanol | 2.8 | 1.5 | 40 | 67% | 16% |
| Example 25 | Acetone | 3.2 | 1.7 | 38 | 64% | 17% |

As shown in Comparative Example 1, when no auxiliary agent is added, the capacity retention rate after cycle and the cycle thickness swelling rate of the lithium-ion battery are poor. As shown in Examples 4 and 21 to 25, adding the auxiliary agent can significantly improve the capacity retention rate after cycle and the cycle thickness swelling rate of the lithium-ion battery. When the oxidation potential of the auxiliary agent is not less than 4.5 V and the reduction potential is not greater than 0.5 V, the capacity retention rate after cycle and the cycle thickness swelling rate of the lithium-ion battery are further improved. Compared with the ethanol and the acetone (as shown in Examples 24 and 25), the nonionic surfactants (as shown in Examples 21 to 23) have a lower surface tension (not greater than 30 mN/m), so that the capacity retention rate after cycle and the cycle thickness swelling rate of the lithium-ion battery can be further improved.

Table 5 shows the effects of the EC content (X mg) in the electrolyte and the reaction area (Y m$^2$) of the anode active material layer on the cycle performance of the lithium-ion battery. The examples in Table 5 are improvements based on Example 4, with the only difference in the parameters listed in Table 5.

TABLE 5

| | X/Y | Capacity Retention Rate After Cycle | Cycle Thickness Swelling Rate |
|---|---|---|---|
| Example 4 | 5 | 82% | 15% |
| Example 26 | 10 | 85% | 10.8% |
| Example 27 | 30 | 88% | 10.2% |
| Example 28 | 50 | 89% | 9.5% |
| Example 29 | 70 | 90% | 8.7% |
| Example 30 | 100 | 81% | 16% |

The results show that when the EC content (X mg) in the electrolyte and the reaction area (Y m$^2$) of the anode active material layer meet $10 \leq (X/Y) \leq 100$, the capacity retention rate after cycle and the cycle thickness swelling rate of the lithium-ion battery are further improved.

Table 6 shows the effects of the electrolyte composition on the cycle performance of the lithium-ion battery. The examples in Table 6 are improvements based on Example 4, with the only difference in the compounds and contents thereof listed in Table 6.

TABLE 6

| | Compound | Content (wt %) | Capacity Retention Rate After Cycle | Cycle Thickness Swelling Rate |
|---|---|---|---|---|
| Example 4 | / | / | 82% | 15% |
| Example 31 | Formula 1a | 1 | 92% | 5.3% |
| Example 32 | Formula 1b | 1 | 88% | 6.7% |
| Example 33 | Formula 1c | 1 | 85% | 8.5% |
| Example 34 | Formula 1d | 1 | 84% | 9.5% |
| Example 35 | Formula 1e | 1 | 83% | 10.2% |
| Example 36 | Formula 1f | 1 | 90% | 6.1% |
| Example 37 | Formula 1g | 1 | 85% | 7.5% |
| Example 38 | Formula 1h | 1 | 87% | 8% |
| Example 39 | Formula 1a | 0.001 | 83% | 12.2% |
| Example 40 | Formula 1a | 0.1 | 90% | 5.8% |
| Example 41 | Formula 1a | 0.5 | 93% | 5.2% |
| Example 42 | Formula 1a | 10 | 84% | 18.5% |

The results show that, on the basis of using the anodes of the embodiments of the present application, adding the compound of Formula 1 to the electrolyte contributes to the formation of an SEI film on the electrode surface, which enhances interface stability and helps to improve the capacity retention rate after cycle and the cycle thickness swelling rate of the lithium-ion battery. When the content of the compound of Formula 1 is 0.001 wt % to 10 wt %, the capacity retention rate after cycle and the cycle thickness swelling rate of the lithium-ion battery are significantly improved.

Table 7 shows the effects of iron group metals in the electrolyte on the cycle performance of the lithium-ion battery. The examples in the table are improvements based on Example 4, with the only difference in the types and contents of the iron group metals listed in Table 7.

TABLE 7

| | Iron Group Metal | Content | Capacity Retention Rate After Cycle | Cycle Thickness Swelling Rate |
|---|---|---|---|---|
| Example 4 | / | / | 82% | 15% |
| Example 43 | Co | 0.008 wt % | 83% | 14.7% |
| Example 44 | Ni | 0.008 wt % | 84% | 14.6% |
| Example 45 | Co Ni | 0.006 wt % 0.002 wt % | 85% | 13.6% |

The results show that, on the basis of using the anodes of the embodiments of the present application, when the electrolyte contains trace iron group metals (for example, cobalt and nickel), it helps to improve the capacity retention rate after cycle and the cycle thickness swelling rate of the lithium-ion battery.

References throughout the specification to "embodiments," "partial embodiments," "one embodiment," "another example," "examples," "specific examples" or "partial examples" mean that at least one embodiment or example of the present application includes specific features, structures, materials or characteristics described in the embodiment or example. Therefore, descriptions appearing throughout the specification, for example, "in some embodiments," "in the embodiments," "in an embodiment," "in another example," "in an example," "in a specific example" or "examples," are not necessarily referring to the same embodiment or example in the present application. In addition, the specific features, structures, materials or characteristics herein can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising: a cathode, an anode and an electrolyte; wherein the anode comprises an anode active material layer, wherein a contact angle of the anode active material layer relative to a non-aqueous solvent is not greater than 60° as measured by a contact angle measurement;
   wherein a porosity of the anode active material layer is 10% to 60%;
   wherein the electrolyte contains ethylene carbonate; and a content X mg of the ethylene carbonate in the electrolyte and a reaction area Y m² of the anode active material layer meet the following relation: 10≤(X/Y)<100.

2. The electrochemical device according to claim 1, wherein a droplet diameter of the non-aqueous solvent on the anode active material layer is not greater than 30 mm as measured by the contact angle measurement.

3. The electrochemical device according to claim 1, wherein the contact angle measurement means that after a 3-microliter droplet of diethyl carbonate is dropwise added to a surface of the anode active material layer, a contact angle of the droplet on the surface of the anode active material layer is tested within 100 seconds.

4. The electrochemical device according to claim 1, wherein the anode active material layer comprises a carbon material, the carbon material having at least one of the following features:

(a) a specific surface area of less than 5 m²/g;
(b) a median particle size of 5 μm to 30 μm.

5. The electrochemical device according to claim 1, wherein the anode active material layer comprises at least one selected from the group consisting of artificial graphite, natural graphite, mesophase carbon microspheres, soft carbon, hard carbon, amorphous carbon, a silicon-containing material, a tin-containing material and an alloy material.

6. The electrochemical device according to claim 1, wherein the anode active material layer further comprises at least one metal selected from the group consisting of molybdenum, iron and copper; and based on the total weight of the anode active material layer, the content of the at least one metal is not greater than 0.05 wt %.

7. The electrochemical device according to claim 1, wherein the anode active material layer further comprises an auxiliary agent; the auxiliary agent having at least one of the following features:
   (a) an oxidation potential of not less than 4.5 V, and a reduction potential of not greater than 0.5 V;
   (b) a surface tension of not greater than 30 mN/m;
   (c) the auxiliary agent comprises a nonionic surfactant; or
   (d) based on the total weight of the anode active material layer, the content of the auxiliary agent is not greater than 3000 ppm.

8. The electrochemical device according to claim 7, wherein the auxiliary agent comprises a nonionic surfactant; and the nonionic surfactant comprises at least one selected from the group consisting of polyoxyethylene ether, polyol ester, amide or block polyether; preferably the nonionic surfactant comprises at least one of the following: polyoxyethylene alkanolamide, octyl phenol polyoxyethylene ether, nonyl phenol polyoxyethylene ether, high carbon fatty alcohol polyoxyethylene ether, polyoxyethylene fatty acid ester, polyoxyethylene amine, alkanolamide, polyoxyethylene lauryl ether, C12-14 primary alcohol polyoxyethylene ether, C12-14 secondary alcohol polyoxyethylene ether, branched C13 Guerbet alcohol polyoxyethylene ether, branched C10 Guerbet alcohol polyoxyethylene, linear C10 alcohol polyoxyethylene ether, linear C8 octanol polyoxyethylene ether, linear C8 isooctanol polyoxyethylene ether, fatty acid monoglyceride, glycerin monostearate, fatty acid sorbitan ester, composite silicone polyether compound, polysorbate, polyoxyethylene fatty acid ester, polyoxyethylene fatty alcohol ether, polyoxyethylene-polyoxypropylene block copolymer, polyether modified trisiloxane and polyether modified organosilicon polyether siloxane.

9. The electrochemical device according to claim 1, wherein the electrolyte further contains a compound of Formula 1:

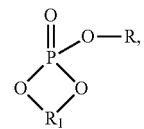

Formula 1 wherein R is a linear or non-linear alkyl having 1 to 5 carbon atoms or —SiR₂R₃R₄, wherein R$_2$, R$_3$ and R$_4$ are each independently alkyl having 1 to 5 carbon atoms, and R$_1$ is an alkylene having 2 to 3 carbon atoms and substituted with a substituent selected from: at least one fluorine atom or alkyl containing at least one fluorine atom and having 1 to 3 carbon atoms.

10. The electrochemical device according to claim 9, wherein, in the compound of Formula 1, R is —SiR$_2$R$_3$R$_4$, and R$_1$ is alkylene having 2 carbon atoms and substituted with a substituent selected from: at least one fluorine atom or alkyl containing at least one fluorine atom and having 1 to 3 carbon atoms.

11. The electrochemical device according to claim 9, wherein the compound of Formula 1 comprises at least one of the compounds represented by Formula 1a to Formula 1h:

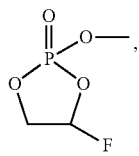
1a

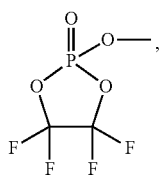
1b

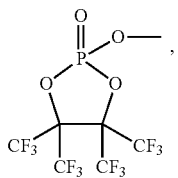
1c

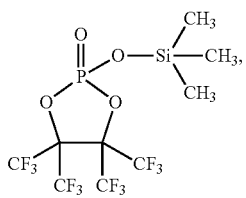
1d

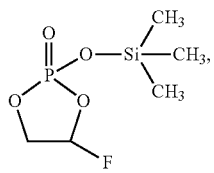
1e

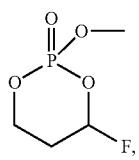
1f

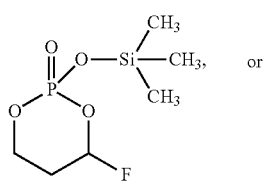
1g or

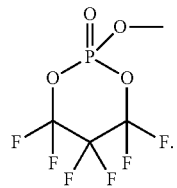
1h

12. The electrochemical device according to claim 7, wherein, based on the total weight of the electrolyte, the content of the compound of Formula 1 is 0.001 wt % to 10 wt %.

13. The electrochemical device according to claim 1, wherein the electrolyte further contains a difluorophosphate and an iron group element, the iron group element comprises a cobalt element, a nickel element or a combination thereof, and based on the total weight of the electrolyte, the content of the iron group element is not greater than 0.05 wt %.

14. An electronic device, comprising an electrochemical device; wherein, the electrochemical device comprises a cathode, an anode and an electrolyte; wherein the anode comprises an anode active material layer; wherein a contact angle of the anode active material layer relative to a non-aqueous solvent is not greater than 60° as measured by a contact angle measurement;

wherein a porosity of the anode active material layer is 10% to 60%;

wherein the electrolyte contains ethylene carbonate; and a content X mg of the ethylene carbonate in the electrolyte and a reaction area Y m2 of the anode active material layer meet the following relation: $10 \leq (X/Y) < 100$.

15. The electronic device according to claim 14, wherein the anode active material layer comprises a carbon material; the carbon material having at least one of the following features:

(a) a specific surface area of less than 5 m$^2$/g;
(b) a median particle size of 5 μm to 30 μm.

16. The electrochemical device according to claim 1, wherein the anode active material layer further comprises an auxiliary agent; the auxiliary agent having at least one of the following features:

(a) an oxidation potential of not less than 4.5 V, and a reduction potential of not greater than 0.5 V;
(b) a surface tension of not greater than 30 mN/m;
(c) the auxiliary agent comprises a nonionic surfactant is comprised;
(d) based on the total weight of the anode active material layer, the content of the auxiliary agent is not greater than 3000 ppm.

17. The electronic device according to claim 14, wherein the electrolyte further contains a compound of Formula 1:

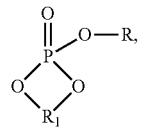

Formula 1 wherein R is linear or non-linear alkyl having 1 to 5 carbon atoms or —SiR$_2$R$_3$R$_4$, wherein R$_2$, R$_3$ and R$_4$ are each independently alkyl having 1 to 5 carbon atoms, and $R_1$ is alkylene having 2 to 3 carbon atoms and substituted with a substituent selected from: at least one fluorine atom or alkyl containing at least one fluorine atom and having 1 to 3 carbon atoms.

* * * * *